United States Patent
Benoit et al.

(10) Patent No.: US 9,654,972 B2
(45) Date of Patent: May 16, 2017

(54) SECURE PROVISIONING OF AN AUTHENTICATION CREDENTIAL

(71) Applicant: QUALCOMM Incorporated, San Diego, CA (US)

(72) Inventors: Olivier Jean Benoit, San Diego, CA (US); Peerapol Tinnakornsrisuphap, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 144 days.

(21) Appl. No.: 14/462,272

(22) Filed: Aug. 18, 2014

(65) Prior Publication Data
US 2016/0050565 A1 Feb. 18, 2016

(51) Int. Cl.
| | | |
|---|---|---|
| *H04L 29/00* | (2006.01) | |
| *H04W 12/06* | (2009.01) | |
| *H04L 29/06* | (2006.01) | |
| *H04W 12/04* | (2009.01) | |

(52) U.S. Cl.
CPC ......... *H04W 12/06* (2013.01); *H04L 63/0853* (2013.01); *H04L 63/18* (2013.01); *H04W 12/04* (2013.01)

(58) Field of Classification Search
CPC .. H04W 12/06; H04W 12/08; H04L 63/0853; H04L 9/32; H04L 9/3234; H04L 63/18; G06F 21/44; G06F 21/45
USPC .......................................................... 713/168
See application file for complete search history.

(56) References Cited

U.S. PATENT DOCUMENTS

| | | | |
|---|---|---|---|
| 7,350,076 B1 | 3/2008 | Young et al. | |
| 8,001,584 B2 | 8/2011 | Lortz et al. | |
| 8,583,915 B1 | 11/2013 | Huang | |
| 2006/0149858 A1* | 7/2006 | Bhesania | H04L 63/08 710/5 |
| 2008/0250244 A1* | 10/2008 | Baentsch | H04L 9/088 713/168 |

(Continued)

FOREIGN PATENT DOCUMENTS

EP 2747363 A1 6/2014

OTHER PUBLICATIONS

Wi-Fi Protected Access (WPA) in a Cisco Unified Wireless Network Configuration Example, Document ID: 100708, Feb. 25, 2008, 24 pages.

(Continued)

*Primary Examiner* — Joseph P Hirl
*Assistant Examiner* — Chi Nguy
(74) *Attorney, Agent, or Firm* — Holland & Hart, LLP

(57) ABSTRACT

Techniques are described for securely provisioning a client device. A client device may output first client information over a secure interface to a trusted device to be transmitted to an authentication server. Second client information related to the first client information may be transmitted to the authentication server. The authentication server may link the second client information and the first client information. The client device may receive an encrypted authentication credential from the authentication server. The authentication credential may be encrypted based at least in part on the first client information or the second client information. The client device may decrypt the encrypted authentication credential using the first client information, the second client information, or a shared secret key.

26 Claims, 24 Drawing Sheets

(56) References Cited

U.S. PATENT DOCUMENTS

| | | | |
|---|---|---|---|
| 2011/0219427 A1 | 9/2011 | Hito et al. | |
| 2013/0086388 A1* | 4/2013 | Tesch | G06F 21/45 |
| | | | 713/183 |
| 2013/0263211 A1* | 10/2013 | Neuman | H04L 63/08 |
| | | | 726/1 |
| 2014/0047510 A1 | 2/2014 | Belton et al. | |
| 2014/0223175 A1* | 8/2014 | Bhatnagar | G09C 5/00 |
| | | | 713/159 |
| 2014/0282961 A1* | 9/2014 | Dorfman | H04L 63/0823 |
| | | | 726/7 |

OTHER PUBLICATIONS

ISA/EPO, International Search Report and Written Opinion of the International Searching Authority, Int'l. App. No. PCT/US2015/044449, Nov. 3, 2015, European Patent Office, Rijswijk, NL, 9 pgs.

* cited by examiner

SECURE PROVISIONING OF AN AUTHENTICATION CREDENTIAL

FIELD OF THE DISCLOSURE

The present disclosure generally relates to wireless communication systems, and more particularly to secure wireless communication with an access point.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links.

The Wi-Fi Protected Access II (WPA2) Enterprise protocol provides a high level of security for Wi-Fi networks, but configuring a client device to connect to an access point with a WPA2 Enterprise connection is a complicated process. Depending on the Extensible Authentication Protocol (EAP) method supported by a network authentication server, different types of credentials are provisioned into the client device. This provisioning is typically performed manually by a network administrator, which is a time consuming process. In addition, the network administrator may perform the provisioning using upper layers of the network. Credentials provisioned from the upper layers of the network, however, may be subject to software attacks.

SUMMARY

The described features generally relate to improved systems, methods, and/or apparatuses for securely provisioning a client device. First client information of the client device may be transmitted to an authentication server via a trusted device. Second client information may be transmitted to the authentication server via an access point. The client information may include a client public key or a token derived from the client public key. The authentication server may determine if there is a link between first client information and the second client information. Once a link is determined, the authentication server may encrypt an authentication credential with the client public key or a shared secret key. The shared secret key may be derived in part based on the client public key. The encrypted authentication credential may be transmitted to the client device via the access point. The client device may then decrypt the encrypted authentication credential using a client private key corresponding to the client public key, or using the shared secret key. The client device may then perform an authentication procedure using the authentication credential to connect to the access point with a secure wireless connection.

In a first set of illustrative examples, a method for securely provisioning a client device is described. In one example, the method may include outputting first client information over a secure interface to a trusted device to be transmitted to an authentication server, transmitting second client information related to the first client information to the authentication server, the second client information being linked to the first client information by the authentication server, receiving an encrypted authentication credential from the authentication server, the encrypted authentication credential being encrypted based at least in part on the first client information or the second client information, and decrypting the encrypted authentication credential.

In some examples of the method, the first client information may include a client public key and the second client information may include a client identification, the client identification being derived from the client public key. In some examples of the method, the encrypted authentication credential is encrypted based at least in part on the client public key transmitted in the first client information, and the encrypted authentication credential is decrypted based at least in part on a client private key corresponding to the client public key. In some examples of the method, the first client information may include a client authentication token and the second client information may include a client public key, the client authentication token being derived from the client public key. In some examples of the method, the encrypted authentication credential is encrypted based at least in part on the client public key transmitted in the second client information, and the encrypted authentication credential is decrypted based at least in part on a client private key corresponding to the client public key.

In some examples, the method may include exchanging a shared secret key with the authentication server, wherein the encrypted authentication credential is decrypted based at least in part on the shared secret key. In some examples, the method may include connecting to an access point associated with the authentication server by completing an authentication procedure using the decrypted authentication credential. In some examples of the method, the authentication procedure may include an Institute of Electrical and Electronics Engineers (IEEE) 802.1X Extensible Authentication Protocol, and connecting to the access point may include a Wi-Fi Protected Access II (WPA2) Enterprise connection. In some examples of the method, the secure interface includes manually entering the first client information, scanning a Quick Response (QR) code of the first client information, transmitting the first client information over an out-of-band wireless channel (e.g. NFC, Bluetooth), or a combination thereof. In some examples, the method may include receiving a server authentication token from the trusted device, the server authentication token being derived from the authentication credential by the authentication server, and verifying the received server authentication token matches a token derived from the decrypted authentication credential.

In a second set of illustrative examples, an apparatus for securely provisioning a client device is described. In one example, the apparatus may include a processor, memory in electronic communication with the processor, and instructions stored in the memory. The instructions may be executable by the processor to output first client information over a secure interface to a trusted device to be transmitted to an authentication server, transmit second client information related to the first client information to the authentication server, the second client information being linked to the first client information by the authentication server, receive an encrypted authentication credential from the authentication server, the encrypted authentication credential being encrypted based at least in part on the first client information or the second client information, and decrypt the encrypted authentication credential. In some examples, the instructions may also be executable by the processor to implement one or more aspects of the method for securely provisioning a client device described above with respect to the first set of illustrative examples.

In a third set of illustrative examples, another apparatus for securely provisioning a client device is described. In one example, the apparatus may include a secure interface output to output first client information over a secure interface to a trusted device to be transmitted to an authentication server, a transmitter to transmit second client information related to the first client information to the authentication server, the second client information being linked to the first client information by the authentication server, a receiver to receive an encrypted authentication credential from the authentication server, the encrypted authentication credential being encrypted based at least in part on the first client information or the second client information, and an authenticator to decrypt the encrypted authentication credential. In some examples, the apparatus may further implement one or more aspects of the method for securely provisioning a client device described above with respect to the first set of illustrative examples.

In a fourth set of illustrative examples, a non-transitory computer-readable medium storing computer-executable code for wireless communication is described. The code may be executable by a processor to output first client information over a secure interface to a trusted device to be transmitted to an authentication server, transmit second client information related to the first client information to the authentication server, the second client information being linked to the first client information by the authentication server, receive an encrypted authentication credential from the authentication server, the encrypted authentication credential being encrypted based at least in part on the first client information or the second client information, and decrypt the encrypted authentication credential. In some examples, the code may also be executable by the processor to implement one or more aspects of the method for securely provisioning a client device described above with respect to the first set of illustrative examples.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
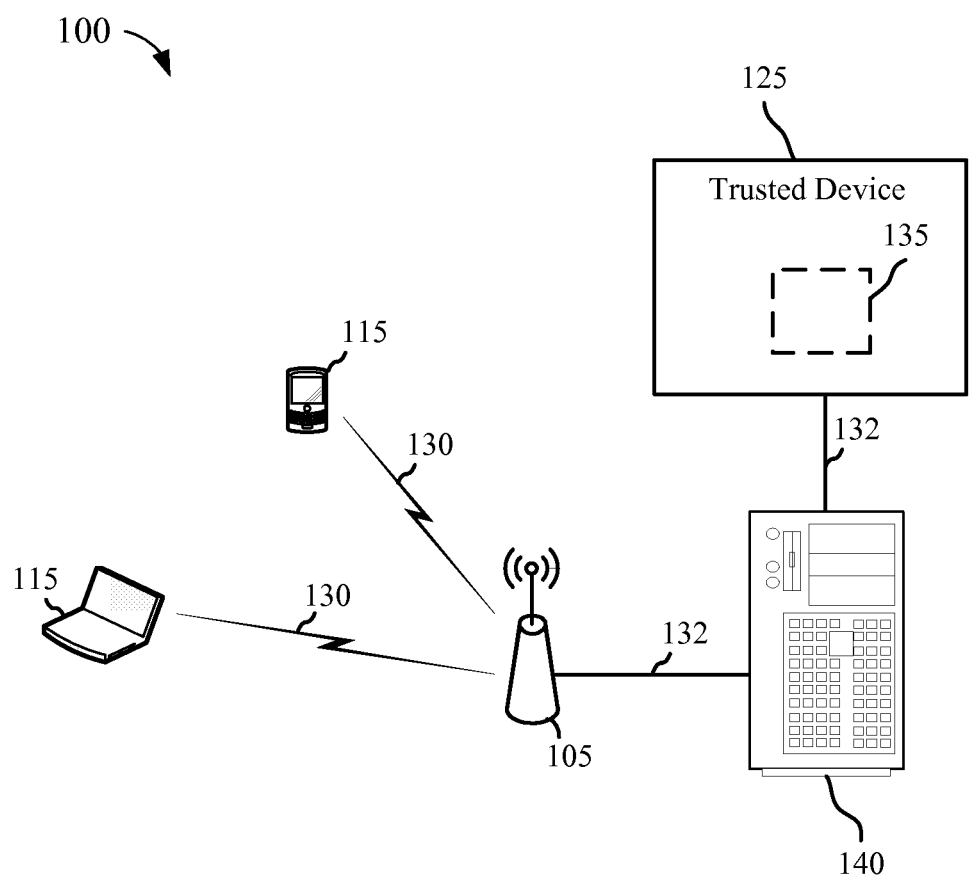
FIG. 1 shows a block diagram of a wireless communications system.

Embodiments that allow a client device to be securely provisioned with the necessary credentials for a secure wireless connection with an access point are described. The necessary credentials are provisioned on the client device with minimal manual input from a user of the client device or an administrator of the access point.

Wireless networks are increasingly being used in conjunction with smaller local networks for internet access and other services. Wi-Fi is one example of such local networks. Wi-Fi is a popular technology that allows an electronic device to exchange data wirelessly (using radio waves) over a computer network, including high-speed Internet connections. The Wi-Fi Alliance defines Wi-Fi as "any wireless local area network (WLAN) product that are based on the Institute of Electrical and Electronics Engineers (IEEE) 802.11 standards."

Wi-Fi technologies based on the IEEE 802.11 standard are enforced by the Wi-Fi Alliance. This includes wireless local area network (WLAN) connections, device to device connectivity (such as Wi-Fi Peer to Peer, also known as Wi-Fi Direct), personal area network (PAN), local area network (LAN) and even some limited wide area network (WAN) connections are covered by the Wi-Fi Alliance and versions of IEEE 802.11.

In order to connect to a Wi-Fi LAN, a computer or other device is equipped with a wireless network interface controller. The combination of the wireless network interface controller and the computer or other device may be known as a station. Stations share a single radio frequency communication channel. Transmission on this channel is received by stations within range. The hardware does not signal the user that the transmission was delivered and therefore, the delivery mechanism is known as a "best effort" delivery mechanism. A carrier wave transmits the data in packets, which may be referred to as "Ethernet frames". A station is constantly tuned to the radio frequency communication channel in order to receive available transmissions.

A Wi-Fi enabled device may connect to the Internet or other resource when within range of a wireless network. Wi-Fi may provide service in private homes, coffee shops and other businesses, hospitals and organizations such as airports, hotels and others.

Wi-Fi offers the advantage of cheaper network deployment for LANs and is often used where cables cannot be run, such as outdoor areas and historical buildings. Most recent consumer devices include wireless network adapters, thus helping to foster use of the technology.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a block diagram of a wireless communications system 100, in accordance with various aspects of the present disclosure. The wireless communications system 100 includes an access point 105, a number of client devices 115, a trusted device 125, and an authentication server 140. The access point 105 may communicate with the client devices 115 over wireless connections 130. The access point 105 may communicate with the authentication server 140 over a network connection 132. The network connection 132 may be a wired or wireless communication link.

The trusted device 125 may be, for example, a user's computer or other administration device that is connected to the authentication server 140. The trusted device 125 may be authorized by the authentication server 140 to participate in the authentication of the client device 115. The trusted device 125 may include a secure interface 135. The secure interface 135 may securely input data from the client devices 115 and securely output data to the client devices 115. The trusted device 125 may communicate either directly or indirectly with the authentication server 140 over a network connection 132. The network connection 132 may be a wired or wireless connection, and the communications over the network connection 132 may be routed through a router and/or access point, such as access point 105.

A client device 115 may output first client information to the trusted device 125 via the secure interface 135. The first client information may include a client public key, a client username, and/or a client authentication token derived from the client public key. The trusted device 125 may then transmit the first client information to the authentication server 140 over the network connection 132. The client device 115 may transmit second client information to the access point 105 over the wireless connection 130, and the access point 105 may transmit the second client information to authentication server 140 over the network connection 132. The second client information may include the client public key, the client username, and/or a client identification (ID) derived from the client public key. The authentication server 140 may then link the first client information to the second client information to determine that the client device 115 is an authorized device. The authentication server 140 may encrypt an authentication credential using the client public key received in the first client information or the second client information. Alternatively, client device 115 and authentication server 140 may exchange a shared secret key using, for example, a Diffie-Hellman key exchange. The shared secret key may be established based in part on the client public key. The encrypted authentication credential may be transmitted to client device 115 via the access point 105, and the client device 115 may decrypt the encrypted authentication credential using a client private key corresponding to the client public key. Alternatively, the client device 115 may decrypt the encrypted authentication credential using the shared secret key exchanged with the authentication server 140. The client device 115 may then use the decrypted authentication credential to perform an authentication procedure with the access point 105 and the authentication server 140. After completing the authentication procedure, the client device 115 may connect to the access point 105 with a secure wireless connection.

The wireless communications system 100 may support operation on multiple carriers (waveform signals of different frequencies). Multi-carrier transmitters can transmit modulated signals simultaneously on the multiple carriers. For example, each wireless connection 130 may be a multi-carrier signal modulated according to various radio technologies. Each modulated signal may be sent on a different carrier and may carry control information (e.g., reference signals, control channels, etc.), overhead information, data, etc.

The access point 105 may wirelessly communicate with the client devices 115 via at least one access point antenna. In some embodiments, the access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The access point 105 may also utilize different radio technologies, such as cellular and/or WLAN radio access technologies. The access point 105 may be associated with the same or different access networks or operator deployments.

The client devices 115 may be dispersed throughout the wireless communications system 100, and each client device 115 may be stationary or mobile. A client device 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A client device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A client device 115 may be able to communicate with macro eNBs, pico eNBs, femto eNBs, relays, and the like. A client device 115 may also be able to communicate over different access networks, such as cellular or other WWAN access networks, or WLAN access networks.

The wireless connections 130 shown in wireless communications system 100 may include uplinks for carrying uplink (UL) transmissions (e.g., from a client device 115 to an access point 105) and/or downlinks for carrying downlink (DL) transmissions (e.g., from an access point 105 to a client device 115). The UL transmissions may also be called reverse link transmissions, while the DL transmissions may also be called forward link transmissions.

Figure 2A:
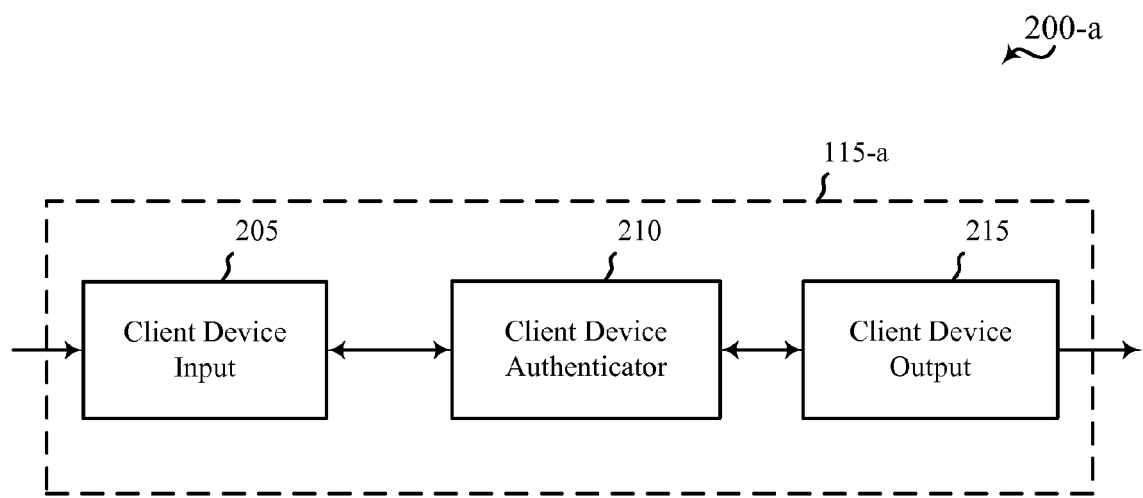
FIGS. 2A, 2B, and 2C show block diagrams illustrating a client device in accordance with various embodiments.

Referring now to FIG. 2A, a block diagram 200-a illustrates a client device 115-a in accordance with various embodiments. The client device 115-a may be an example of at least one aspect of the client devices 115 described with reference to FIG. 1. The client device 115-a may include a client device input 205, a client device authenticator 210, and a client device output 215. Each of these components may be in communication with each other.

The components of the client device 115-a may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The client device output 215 may send communications from the client device 115-a to other devices, such as the trusted device 125 and the access point 105 of the system 100 shown in FIG. 1. The client device input 205 may receive communications from other devices, such as the trusted device 125 and the access point 105. The client device authenticator 210 may perform authentication, encryption, decryption, and other operations involved in authenticating and securing a connection of the client device 115-a to the access point 105. The client device 115-a or the client device authenticator 210 may include a processor for performing such functionality.

Figure 2B:
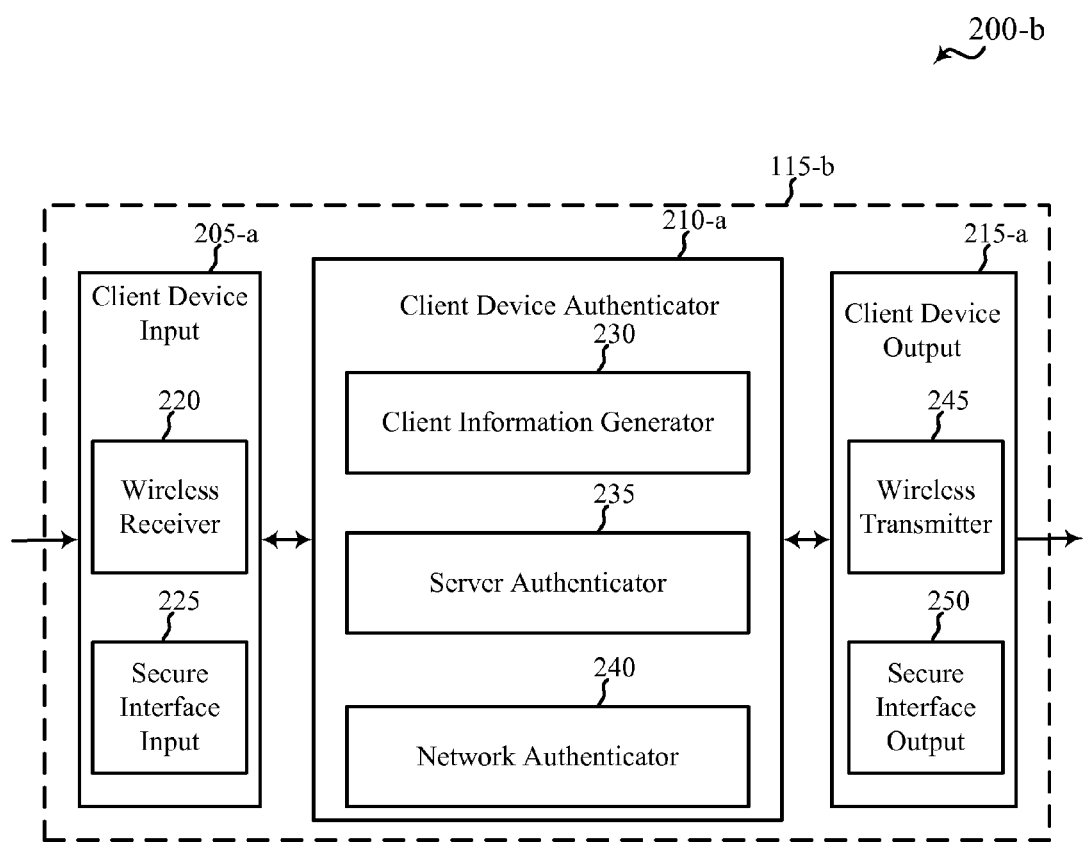

FIG. 2B is a block diagram 200-b illustrating a client device 115-b in accordance with various embodiments. The client device 115-b may be an example of at least one aspect of the client devices 115 described with reference to FIGS. 1 and/or 2A. The client device 115-b may include a client device input 205-a, a client device authenticator 210-a, and a client device output 215-a. Each of these components may be in communication with each other.

The components of the client device 115-b may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The client device input 205-a, the client device authenticator 210-a, and the client device output 215-a may be configured to perform operations as previously described with reference to FIG. 2A. The client device input 205-a may include a wireless receiver 220 and a secure interface input 225. The client device output 215-a may include a wireless transmitter 245 and a secure interface output 250. The client device authenticator 210-a may include a client information generator 230, a server authenticator 235, and a network authenticator 240.

The wireless receiver 220, secure interface input 225, wireless transmitter 245, and secure interface output 250 may communicate with the access point 105 and trusted device 125 of the system 100 shown in FIG. 1. The wireless receiver 220 may receive communications from the access point 105. The wireless transmitter 245 may transmit communications to the access point 105. The secure interface input 225 may input communications from the secure interface 135 of the trusted device 125. The secure interface input 225 may include, for example, a text input interface, a quick response (QR) code reader, or an out-of-band wireless input, such as a near-field communication (NFC) input or a Bluetooth input. The secure interface output 250 may output communications to the secure interface 135 of the trusted device 125. The secure interface output 250 may include, for example, a display for displaying text or a QR code, or an out-of-band wireless output, such as an NFC output or a Bluetooth output.

The client information generator 230 may be configured to execute various operations to generate client information as described herein. The server authenticator 235 may be configured to execute various operations to authenticate the identity of the authentication server 140 as described herein. The network authenticator 240 may be configured to execute various operations to authenticate and secure a connection between the client device 115-b and the access point 105 as described herein. The client information generator 230, server authenticator 235, and network authenticator 240 may cooperate with the client device input 205-a and the client device output 215-a in carrying out such operations. The client device 115-b or the client device authenticator 210-a may include a processor for performing such functionality.

Figure 2C:
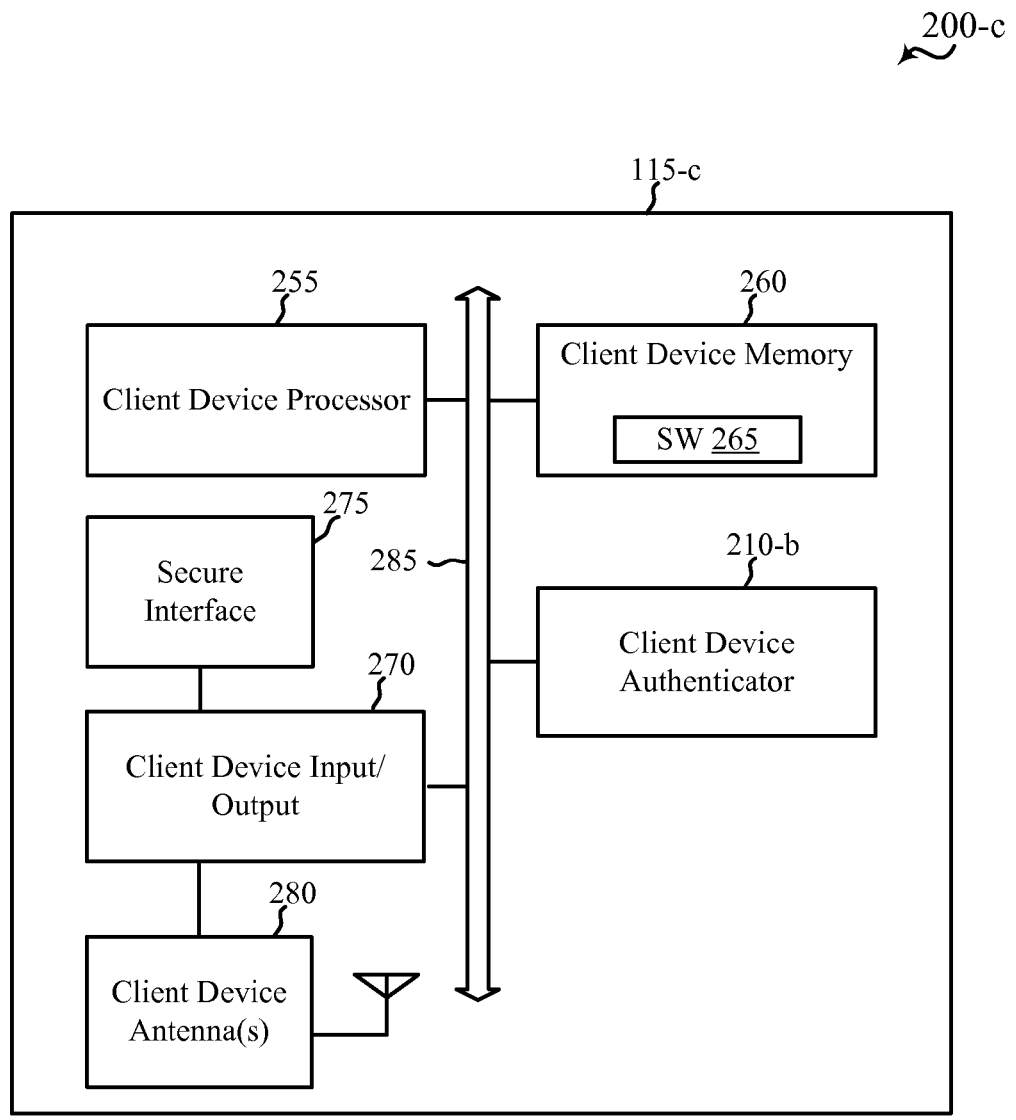

FIG. 2C is a block diagram 200-c illustrating a client device 115-c according to various embodiments. The client device 115-c may be an example of at least one aspect of the client devices 115 described with reference to FIGS. 1, 2A, and/or 2B. The client device 115-c may have any of various configurations, such as personal computers (e.g., laptop computers, netbook computers, tablet computers, etc.), cellular telephones, PDAs, digital video recorders (DVRs), internet appliances, gaming consoles, e-readers, etc. The client device 115-c may have an internal power supply (not shown), such as a small battery, to facilitate mobile operation.

In the configuration shown, the client device 115-c includes a client device processor 255, a client device memory 260, a client device input/output 270, a secure interface 275, and client device antennas 280, which each may be in communication, directly or indirectly, with each other (e.g., via buses 285). The client device input/output 270 is configured to communicate bi-directionally with the secure interface 275 and client device antenna(s) 280, as described above. For example, the client device input/output 270 may be configured to communicate bi-directionally with the access point 105 and trusted device 125 of FIGS. 1, 2A, and/or 2B. The client device input/output 270 may include the client device input 205 and the client device output 215 of FIGS. 2A and/or 2B, and/or the wireless receiver 220 and the wireless transmitter 245 of FIG. 2B, as previously described. In one embodiment, the client device input/output 270 may further include a modem configured to modulate packets and provide the modulated packets to the client device antenna(s) 280 for transmission, and to demodulate packets received from the client device antenna(s) 280. While the client device 115-c may include a single antenna, the client device 115-c will typically include multiple antennas 280 for multiple links.

The client device memory 260 may include random access memory (RAM) and read-only memory (ROM). The client device memory 260 may store computer-readable, computer-executable software code 265 containing instructions that are configured to, when executed, cause the client device processor 255 to perform various functions described herein (e.g., authenticate, derive, encrypt, decrypt, receive, transmit, etc.). Alternatively, the software 265 may not be directly executable by the client device processor 255 but be configured to cause the client device (e.g., when compiled and executed) to perform functions described herein. The client device processor 255 may include an intelligent hardware device, e.g., a central processing unit (CPU), a microcontroller, an application specific integrated circuit (ASIC), etc.

A client device authenticator 210-b may be a component of the client device 115-c in communication with some or all of the other components of the client device 115-c via the bus 285. Alternatively, functionality of the client device authenticator 210-b may be implemented as a component of the client device input/output 270, as a computer program product, and/or as controller elements of the client device processor 255. The client device authenticator 210-b may be an example of at least one aspect of one of the client device authenticators 210 described with reference to FIGS. 2A and/or 2B.

The components of the client device 115-c may, individually or collectively, be implemented with at least one application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by a general or application-specific processor. Each of the noted components may be a means for performing functions related to operation of the client device 115-c as described herein.

Figure 3A:
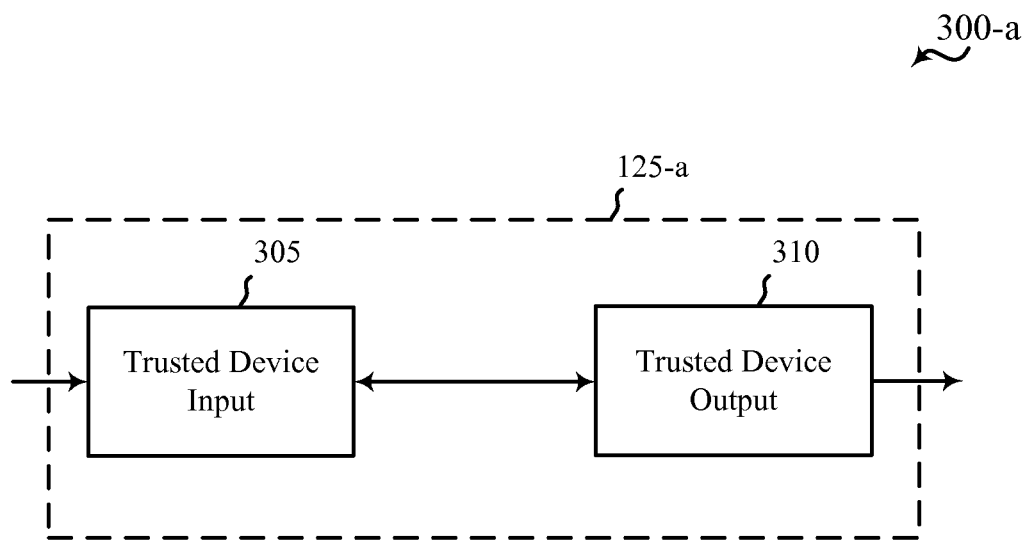
FIGS. 3A, 3B, and 3C show block diagrams illustrating a trusted device in accordance with various embodiments.

Referring now to FIG. 3A, a block diagram 300-a illustrates a trusted device 125-a in accordance with various embodiments. The trusted device 125-a may be an example of at least one aspect of the trusted device 125 described with reference to FIG. 1. The trusted device 125-a may include a trusted device input 305 and a trusted device output 310, which may be in communication with each other.

The components of the trusted device 125-a may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The trusted device output 310 may send communications from the trusted device 125-a to other devices, such as the client devices 115 and the authentication server 140 of the system 100 shown in FIG. 1. The trusted device input 305 may receive communications from other devices, such as the client devices 115 and the authentication server 140. The trusted device 125-a may include a processor for performing such functionality.

Figure 3B:
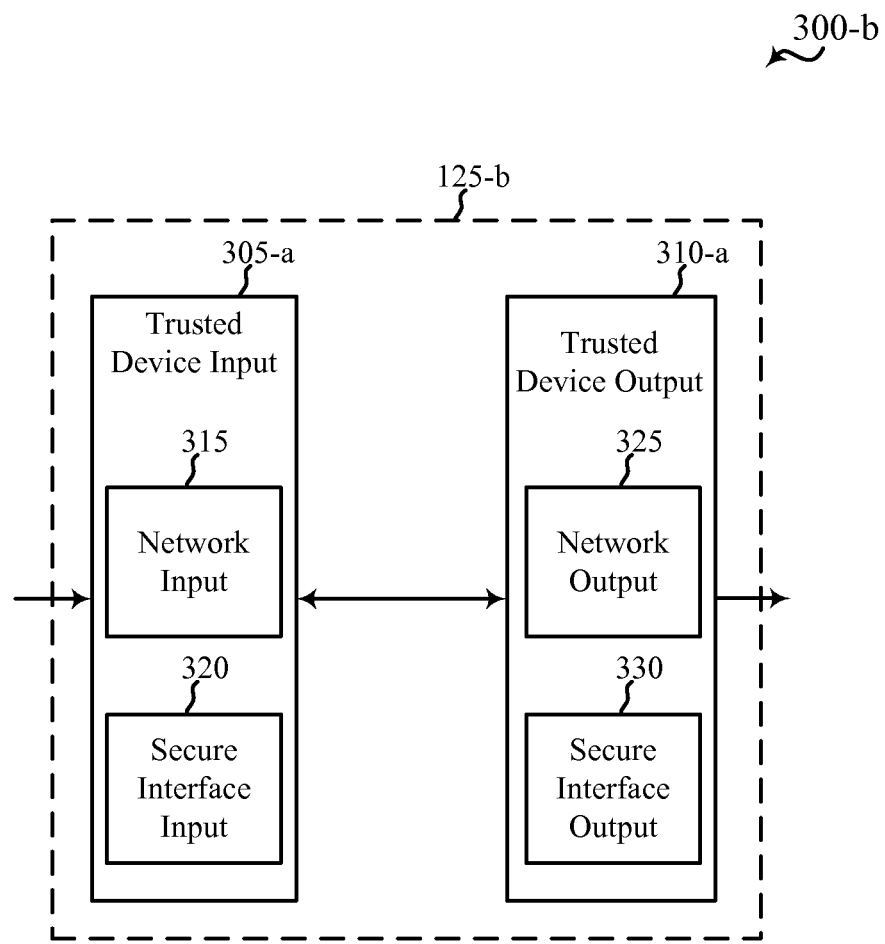

FIG. 3B is a block diagram 300-b illustrating a trusted device 125-b in accordance with various embodiments. The trusted device 125-b may be an example of at least one aspect of the trusted device 125 described with reference to FIGS. 1 and/or 3A. The trusted device 125-b may include a trusted device input 305-a and a trusted device output 310-a, which may be in communication with each other.

The components of the trusted device 125-b may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The trusted device input 305-a and the trusted device output 310-a may be configured to perform operations as previously described with reference to FIG. 3A. The trusted device input 305-a may include a network input 315 and a secure interface input 320. The trusted device output 310-a may include a network output 325 and a secure interface output 330.

The network input 315, secure interface input 320, network output 325, and secure interface output 330 may communicate with the client devices 115 and authentication server 140 of the system 100 shown in FIG. 1. The network input 315 may receive communications from the authentication server 140, either directly or indirectly. For example, the network input 315 may receive communications from the authentication server 140 directly from the network connection 132 with the authentication server 140. Alternatively, or in addition, the network input 315 may receive communications over the network connection 132 that are first routed through a router and/or access point, such as access point 105. Therefore, the network input 315 may include a wired or wireless interface.

The secure interface input 320 and secure interface output 330 may be components of the secure interface 135 shown in FIG. 1. The secure interface input 320 may input communications from the secure interface output 250 of the client device 115-b described with reference to FIG. 2B, and/or the secure interface 275 of the client device 115-c described with reference to FIG. 2C. The secure interface input 320 may include, for example, a text input interface, a quick response (QR) code reader, or an out-of-band wireless input, such as an NFC input or a Bluetooth input. The secure interface output 330 may output communications to the secure interface input 225 of the client device 115-b described with reference to FIG. 2B, and/or the secure interface 275 of the client device 115-c described with reference to FIG. 2C. The secure interface output 330 may include, for example, a display for displaying text or a QR code, or an out-of-band wireless output, such as an NFC output or a Bluetooth output.

Figure 3C:
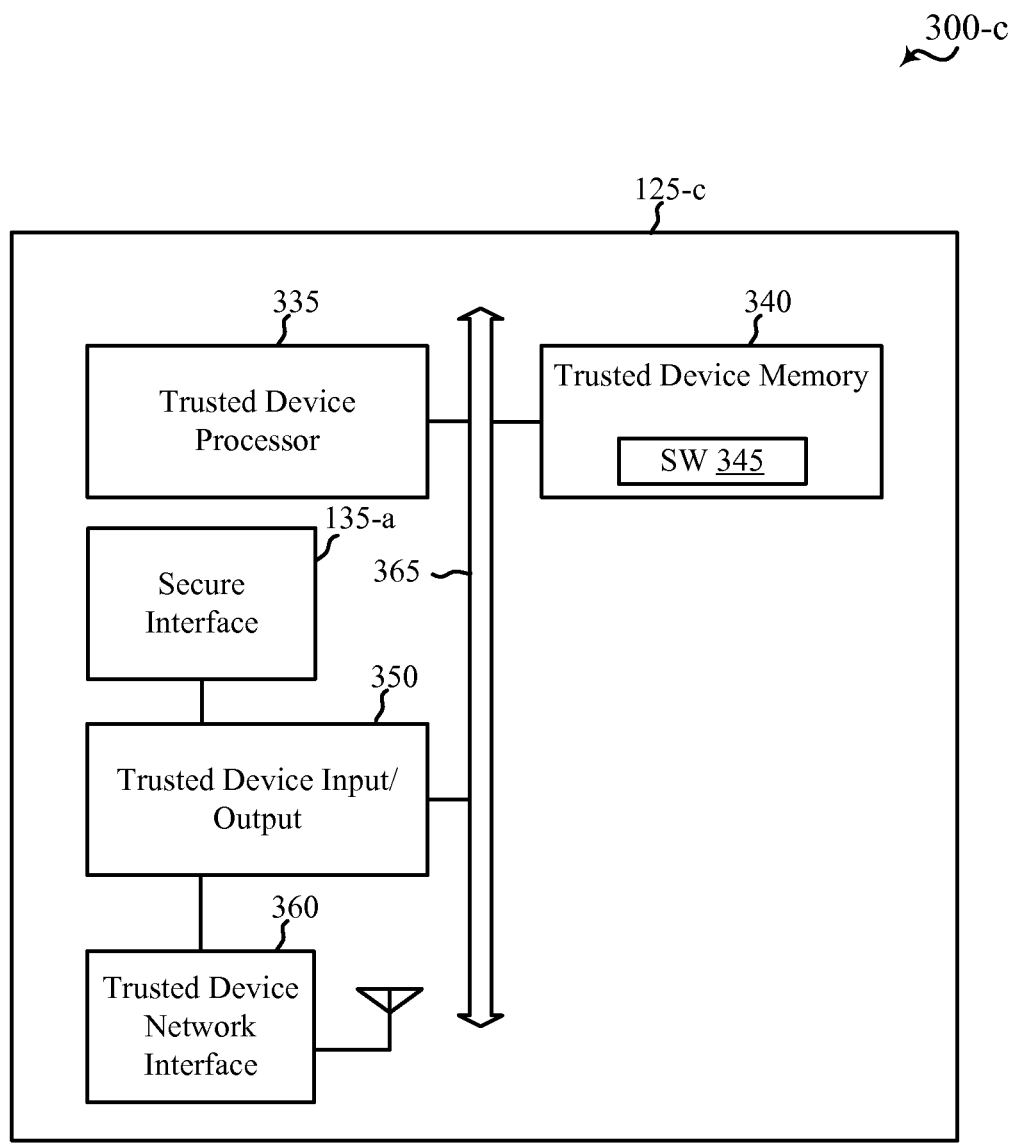

FIG. 3C is a block diagram 300-c illustrating a trusted device 125-c according to various embodiments. The trusted device 125-c may be an example of at least one aspect of the trusted device 125 described with reference to FIGS. 1, 3A, and/or 3B. The trusted device 125-c may have any of various configurations, such as personal computers (e.g., laptop computers, netbook computers, tablet computers, etc.), cellular telephones, PDAs, digital video recorders (DVRs), internet appliances, gaming consoles, e-readers, etc. The trusted device 125-c may have an internal power supply (not shown), such as a small battery, to facilitate mobile operation.

In the configuration shown, the trusted device 125-c includes a trusted device processor 335, a trusted device memory 340, a trusted device input/output 350, a secure interface 135-a, and a trusted device network interface 360, which each may be in communication, directly or indirectly, with each other (e.g., via bus 365). The secure interface 135-a may be an example of at least one aspect of the secure interface 135 described with reference to FIG. 1. The trusted device input/output 350 is configured to communicate bi-directionally with the secure interface 135 and trusted device network interface 360, as described above. For example, the trusted device input/output 350 may be configured to communicate bi-directionally with the client devices 115 and authentication server 140 of FIGS. 1, 2A, 2B, 2C, 3A, and/or 3B. The trusted device input/output 350 may include the trusted device input 305 and the trusted device output 310 of FIGS. 3A and/or 3B, as previously described. In one embodiment, the trusted device input/output 350 may further include a modem configured to modulate packets and provide the modulated packets to the trusted device network interface 360 for transmission, and to demodulate packets received from the trusted device network interface 360. The trusted device network interface 360 may include at least one port for wired connections and/or at least one antenna for wireless connections.

The trusted device memory 340 may include random access memory (RAM) and read-only memory (ROM). The trusted device memory 340 may store computer-readable, computer-executable software code 345 containing instructions that are configured to, when executed, cause the trusted device processor 335 to perform various functions described herein (e.g., authenticate, derive, encrypt, decrypt, receive, transmit, etc.). Alternatively, the software 345 may not be directly executable by the trusted device processor 335 but be configured to cause the trusted device (e.g., when compiled and executed) to perform functions described herein. The trusted device processor 335 may include an intelligent hardware device, e.g., a central processing unit (CPU), a microcontroller, an application specific integrated circuit (ASIC), etc.

The components of the trusted device 125-c may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors. Each of the noted components may be a means for performing functions related to operation of the trusted device 125-c as described herein.

Figure 4A:
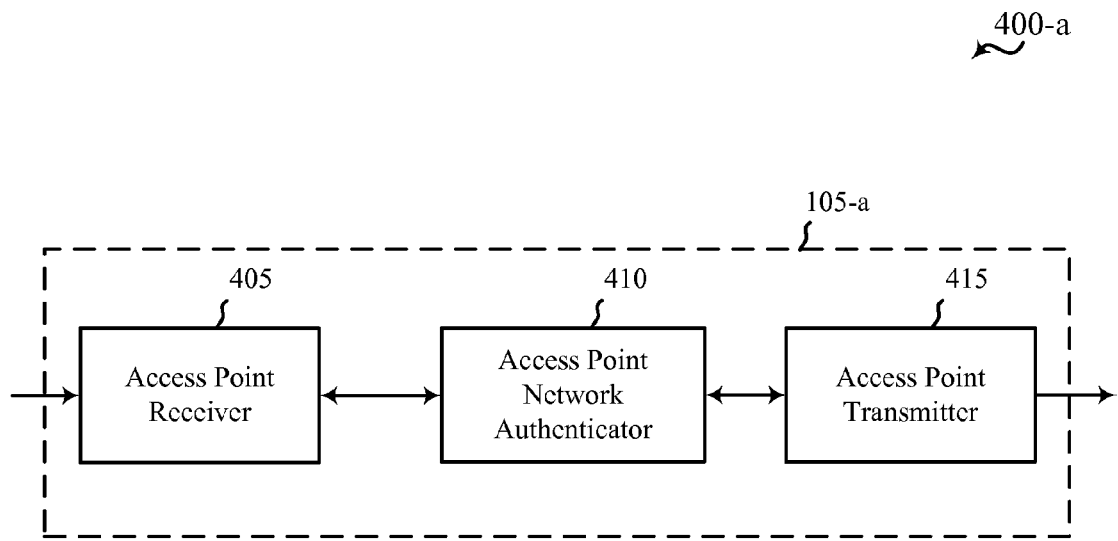
FIGS. 4A, 4B, and 4C show block diagrams illustrating an access point in accordance with various embodiments.

Referring now to FIG. 4A, a block diagram 400-a illustrates an access point 105-a in accordance with various embodiments. The access point 105-a may be an example of at least one aspect of the access point 105 described with reference to FIG. 1. The access point 105-a may include an access point receiver 405, an access point network authenticator 410, and an access point transmitter 415. Each of these components may be in communication with each other.

The components of the access point 105-a may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The access point transmitter 415 may send communications from the access point 105-a to other devices, such as the client device 115 and the authentication server 140 of the system 100 shown in FIG. 1. The access point receiver 405 may receive communications from other devices, such as the client device 115 and the authentication server 140. The access point network authenticator 410 may perform authentication, encryption, decryption, and other operations involved in authenticating and securing a connection of the client device 115-a to the access point 105-a. The access point 105-a or the access point network authenticator 410 may include a processor for performing such functionality.

Figure 4B:
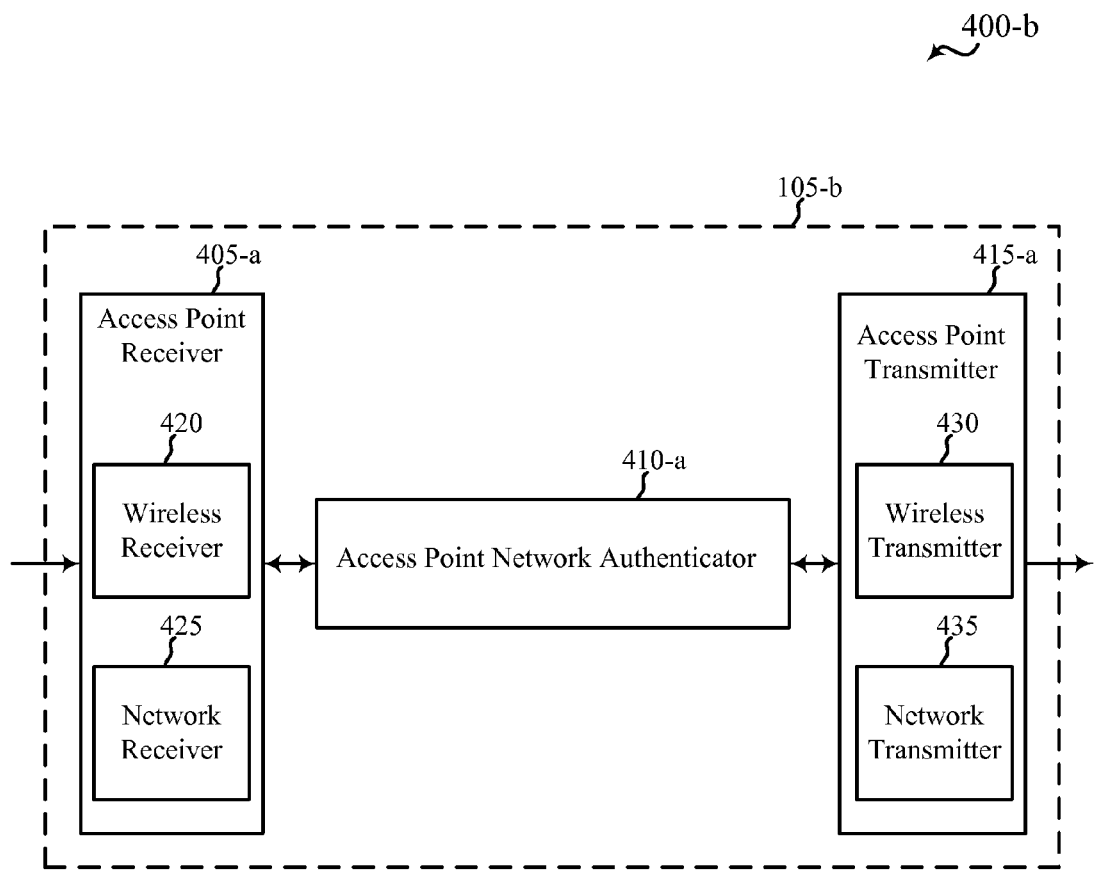

FIG. 4B is a block diagram 400-b illustrating an access point 105-b in accordance with various embodiments. The access point 105-b may be an example of at least one aspect of the access point 105 described with reference to FIGS. 1 and/or 4A. The access point 105-b may include an access point receiver 405-a, an access point network authenticator 410-a, and an access point transmitter 415-a. Each of these components may be in communication with each other.

The components of the access point 105-b may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The access point receiver 405-a, the access point network authenticator 410-a, and the access point transmitter 415-a may be configured to perform operations as previously described with reference to FIG. 4A. The access point receiver 405-a may include a wireless receiver 420 and a network receiver 425. The access point transmitter 415-a may include a wireless transmitter 430 and a network transmitter 435.

The wireless receiver 420, network receiver 425, wireless transmitter 430, and network transmitter 435 may communicate with the client devices 115 and authentication server 140 of the system 100 shown in FIG. 1. The wireless receiver 420 may receive communications from the client devices 115. The wireless transmitter 430 may transmit communications to the client devices 115. The network receiver 425 may receive communications from the authentication server 140 over the network connection 132. The network transmitter 435 may receive communications from the authentication server 140 over the network connection 132. The network connection 132 may be a wired or wireless communication link.

The access point network authenticator 410-a may be configured to execute various operations to authenticate and secure a connection between the client devices 115 and the access point 105-b as described herein. The access point network authenticator 410-a may cooperate with the access point receiver 405-a and the access point transmitter 415-a in carrying out such operations. The access point 105-b or the access point network authenticator 410-a may include a processor for performing such functionality.

Figure 4C:
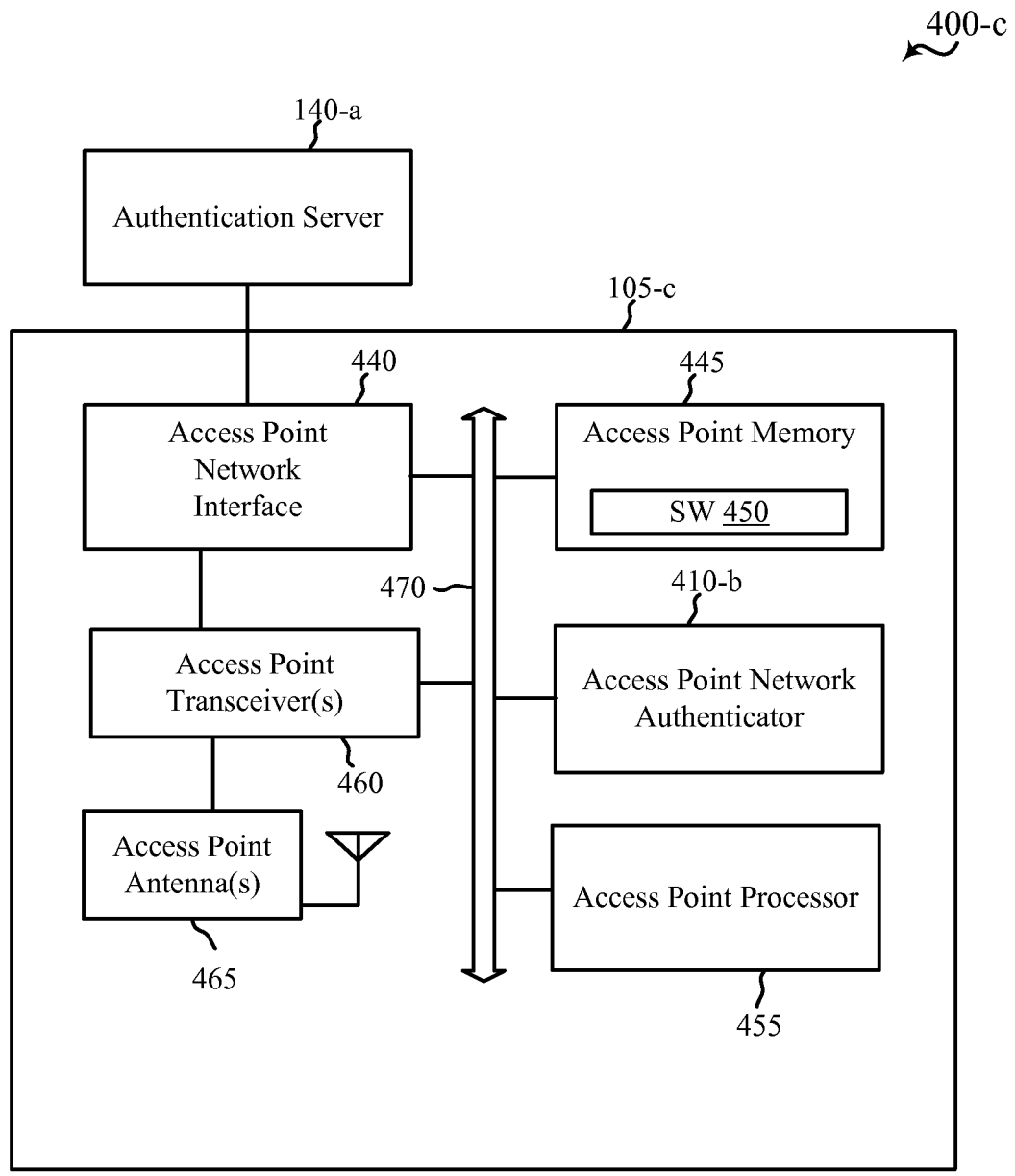

FIG. 4C is a block diagram 400-c illustrating an access point 105-c according to various embodiments. The access point 105-c may be an example of at least one aspect of the access point 105 described with reference to FIGS. 1, 4A, and/or 4B. In the configuration shown, the access point 105-c includes an access point network interface 440, an access point memory 445, an access point processor 455, at least one access point transceiver 460, and at least one access point antenna 465, which each may be in communication, directly or indirectly, with each other (e.g., via bus 470). The access point transceiver(s) 460 are configured to communicate bi-directionally with the access point network interface 440 and access point antenna(s) 465, as described above. For example, the access point transceiver(s) 460 may be configured to communicate bi-directionally with the client devices 115 of FIGS. 1, 2A, 2B, and/or 2C via the access point antenna(s) 465. In addition, the access point transceiver(s) 460 may be configured to communicate bi-directionally with an authentication server 140-a via the access point network interface 440. The authentication server 140-a may be an example of at least one aspect of the authentication server 140 described with reference to FIG. 1. The access point network interface 440 may include a wired and/or wireless interface for communication with the authentication server 140-a.

The access point transceiver(s) 460 may include the access point receiver 405 and the access point transmitter 415 of FIGS. 4A and/or 4B, as previously described. In one embodiment, the access point transceiver(s) may further include a modem configured to modulate packets and provide the modulated packets to the access point antenna(s) 465 and/or access point network interface 440 for transmission, and to demodulate packets received from the access point antenna(s) 465 and/or access point network interface 440. While the access point 105-c may include a single antenna, the access point 105-c will typically include multiple antennas 465 for multiple links.

The access point memory 445 may include random access memory (RAM) and read-only memory (ROM). The access point memory 445 may store computer-readable, computer-executable software code 450 containing instructions that are configured to, when executed, cause the access point processor 455 to perform various functions described herein (e.g., authenticate, derive, encrypt, decrypt, receive, transmit, etc.). Alternatively, the software 450 may not be directly executable by the access point processor 455 but may be configured to cause the access point (e.g., when compiled and executed) to perform functions described herein. The access point processor 455 may include an intelligent hardware device, e.g., a central processing unit (CPU), a microcontroller, an application specific integrated circuit (ASIC), etc.

An access point network authenticator 410-b may be a component of the access point 105-c in communication with some or all of the other components of the access point 105-c via the bus 470. Alternatively, functionality of the access point network authenticator 410-b may be implemented as a component of the access point transceiver(s) 460, as a computer program product, and/or as controller elements of the access point processor 455. The access point network authenticator 410-b may be an example of at least one aspect of one of the access point network authenticators 410 described with reference to FIGS. 4A and/or 4B.

The components of the access point 105-c may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors. Each of the noted components may be a means for performing functions related to operation of the access point 105-c as described herein.

Figure 5:
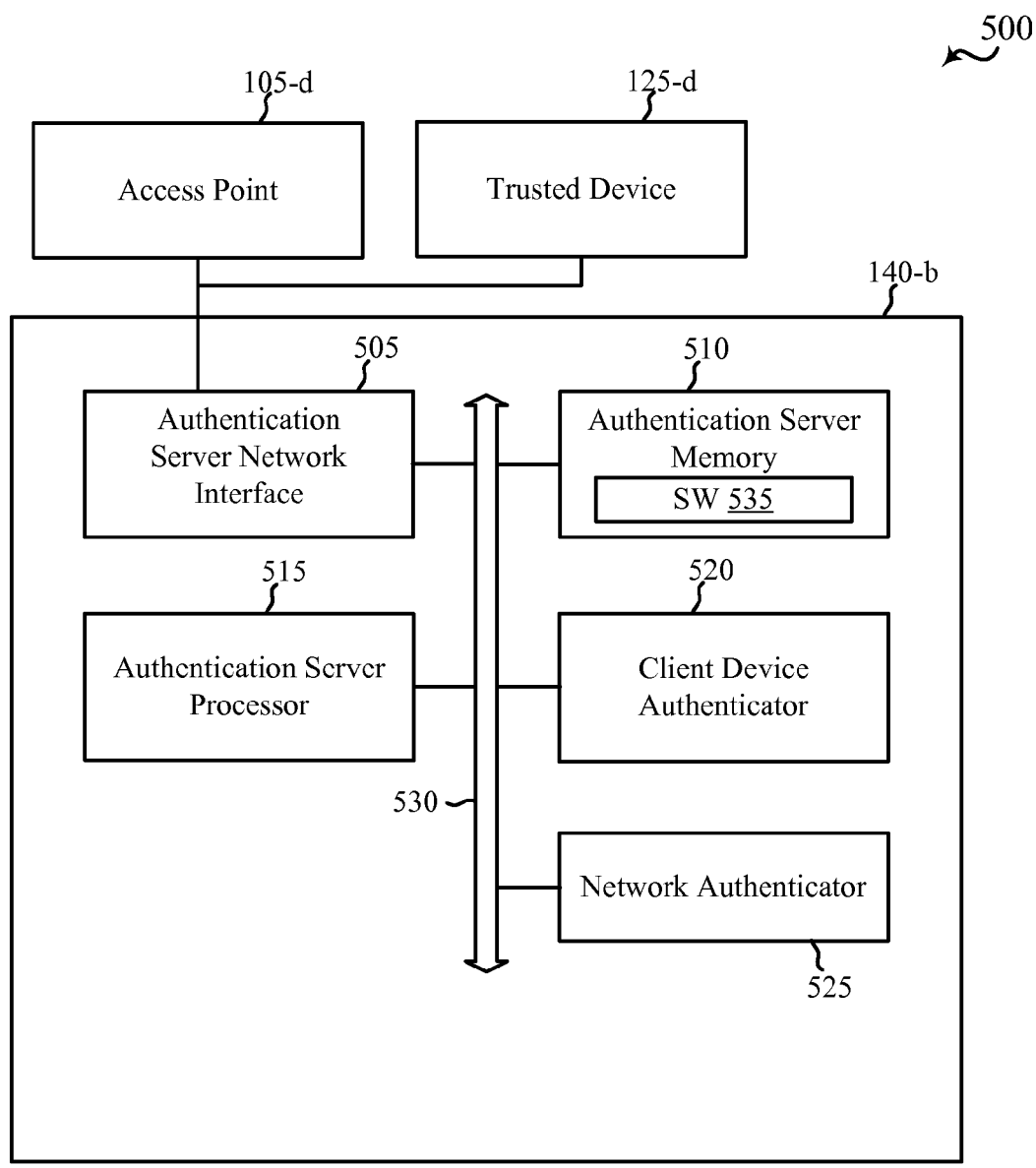
FIG. 5 shows a block diagram illustrating an authentication server according to various embodiments.

FIG. 5 is a block diagram 500 illustrating an authentication server 140-b according to various embodiments. The authentication server 140-b may be an example of at least one aspect of the authentication server 140 described with reference to FIG. 1. In the configuration shown, the authentication server 140-b includes an authentication server network interface 505, an authentication server memory 510, an authentication server processor 515, a client device authenticator 520, and a network authenticator 525, which each may be in communication, directly or indirectly, with each other (e.g., via bus 530). The authentication server network interface 505 may be configured to communicate bi-directionally with an access point 105-d and a trusted device 125-d. The access point 105-d and trusted device 125-d may be an example of at least one aspect of the access point 105 and trusted device 125 described with reference to FIGS. 1, 3A, 3B, 3C, 4A, 4B, and/or 4C. The authentication server network interface 505 may include a wired and/or wireless interface for communication with the access point 105-d and trusted device 125-d. In one embodiment, the authentication server network interface 505 may further include a modem configured to modulate packets for transmission, and to demodulate received packets.

The authentication server memory 510 may include random access memory (RAM) and read-only memory (ROM). The authentication server memory 510 may store computer-readable, computer-executable software code 535 containing instructions that are configured to, when executed, cause the authentication server processor 515 to perform various functions described herein (e.g., authenticate, derive, encrypt, decrypt, receive, transmit, etc.). Alternatively, the software 535 may not be directly executable by the authentication server processor 515 but be configured to cause the authentication server (e.g., when compiled and executed) to perform functions described herein. The authentication server processor 515 may include an intelligent hardware device, e.g., a central processing unit (CPU), a microcontroller, an application specific integrated circuit (ASIC), etc.

The client device authenticator 520 may be configured to execute various operations to authenticate the identity of the client devices 115 as described herein. The network authenticator 525 may be configured to execute various operations to authenticate and secure a connection between the client devices 115 and the access point 105 as described herein. The client device authenticator 520 and network authenticator 525 may be in communication with some or all of the other components of the authentication server 140-b via the bus 530. Alternatively, functionality of the client device authenticator 520 and network authenticator 525 may be implemented as a computer program product and/or as controller elements of the authentication server processor 515.

The components of the authentication server 140-b may, individually or collectively, be implemented with application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors. Each of the noted components may be a means for performing functions related to operation of the authentication server 140-b as described herein.

Figure 6:
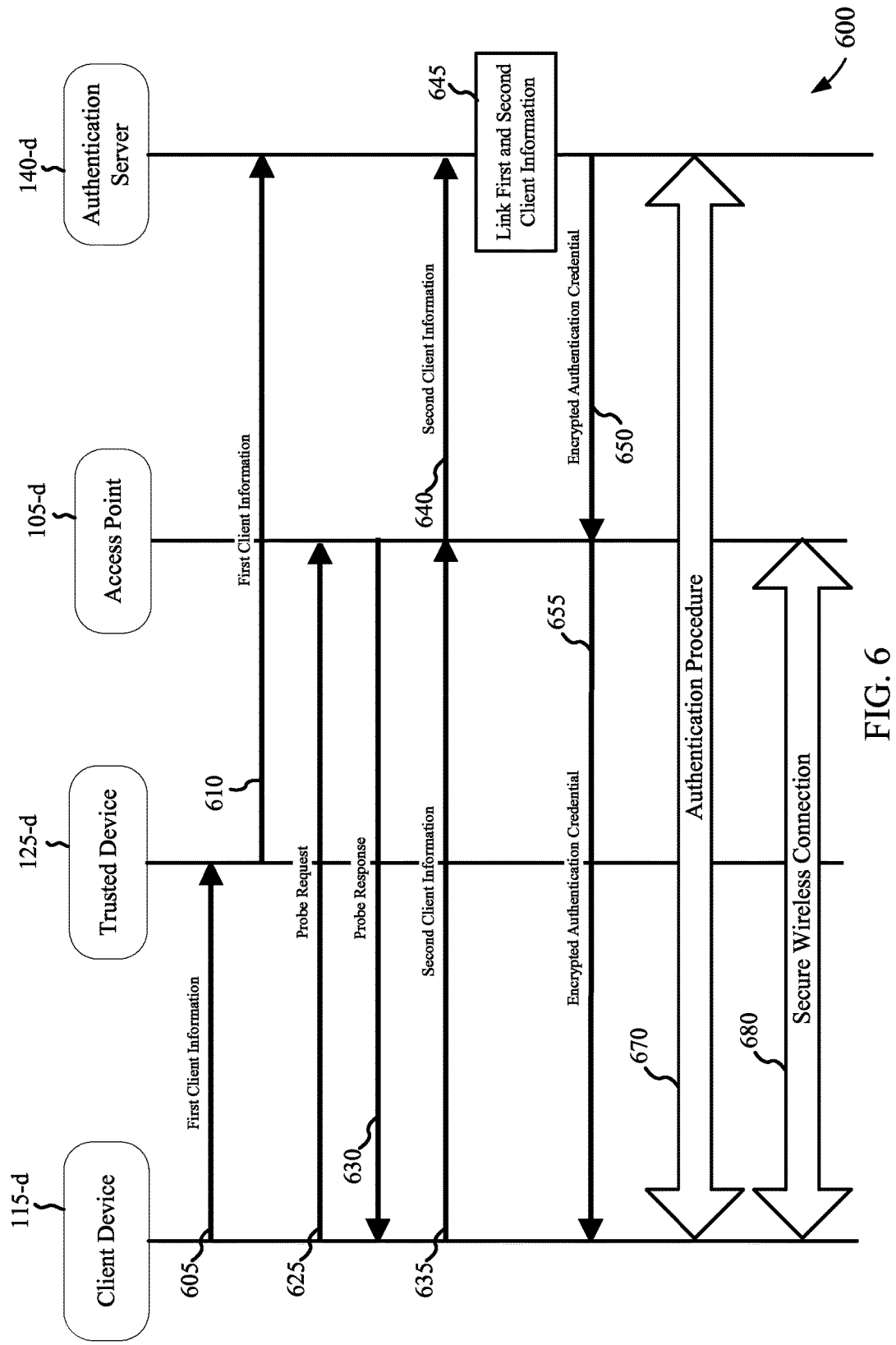
FIG. 6 shows a message flow diagram illustrating an example of communications between a client device, a trusted device, an access point, and an authentication server.

FIG. 6 is a message flow diagram 600 illustrating one example of communications between a client device 115-d, a trusted device 125-d, an access point 105-d, and an authentication server 140-d. The client device 115-d may be an example of the client devices 115 described with reference to FIGS. 1, 2A, 2B, and/or 2C. The trusted device 125-d may be an example of the trusted device 125 described with reference to FIGS. 1, 3A, 3B, and/or 3C. The access point 105-d may be an example of the access point 105 described with reference to FIGS. 1, 4A, 4B, and/or 4C. The authentication server 140-d may be an example of the authentication server 140 described with reference to FIGS. 1 and/or 5.

In one configuration, the client device 115-d may be triggered to output first client information to the trusted device 125-d, denoted 605 in FIG. 6. The first client information may include a client public key, a client username, and/or a client authentication token. The client authentication token may be a string of characters derived from the client public key, such as by calculating a hash of the client public key. The client authentication token may be derived by the client information generator 230 of the client device 115-d. The first client information may be output over the secure interface output 250 of the client device 115-d by, for example, displaying the first client information as text on a display of the client device 115-d, displaying the first client information as a QR code on a display of the client device 115-d, or transmitting the first client information from the client device 115-d via an out-of-band wireless signal such as NFC or Bluetooth. After client device 115-d outputs the first client information, the first client information may be input into the secure interface 135 of the trusted device 125-d. The first client information may be input into secure interface input 320 of the trusted device 125-d by, for example, typing the text displayed on the client device 115-d into a text input interface, scanning the QR code displayed on the client device 115-d with a QR code reader, or receiving the out-of-band wireless signal on an out-of-band wireless input, such as an NFC input or a Bluetooth input.

After the first client information is input into secure interface 135 of the trusted device 125-d, the trusted device 125-d may transmit the first client information, either directly or indirectly, to the authentication server 140-d, denoted 610. The first client information may be transmitted to the authentication server 140-d over the network output 325 of the trusted device 125-d. The transmission may be a wired or wireless transmission, and the transmission may be routed through a router and/or access point, such as access point 105-d. The authentication server 140-d may receive the first client information via the authentication server network interface 505, and may store the received first client information in authentication server memory 510.

When the client device 115-d is triggered to output the first client information, the client device 115-d may also be triggered to send a probe request to the access point 105-d, denoted 625. The probe request may be transmitted by the wireless transmitter 245 of the client device 115-d and received by the wireless receiver 420 of the access point 105-d. The access point 105-d may respond to the probe request with a probe response, denoted 630. The probe response may be transmitted by the wireless transmitter 430 of the access point 105-d and received by the wireless receiver 220 of the client device 115-d.

After receiving the probe response from the access point 105-d, the client device 115-d may transmit second client information to the access point 105-d, denoted 635. The second client information may be transmitted by the wireless transmitter 245 of the client device 115-d and received by the wireless receiver 420 of the access point 105-d. The second client information may include the client public key, the client username, and/or a client identification (ID). The client ID may be a value derived from the client public key, such as by calculating a hash of the client public key. The client ID may be derived by the client information generator 230 of the client device 115-d.

After receiving the second client information, the access point 105-d may transmit the second client information to the authentication server 140-d, denoted 640. The second client information may be transmitted by the network transmitter 435 of the access point 105-d and received by the authentication server network interface 505 of the authentication server 140-d. The authentication server 140-d may store the received second client information in the authentication server memory 510.

After receiving the second client information, the client device authenticator 520 of the authentication server 140-d may compare the first client information and the second client information to determine if they are linked, denoted 645. If the first client information included the client public key and the second client information also included the client public key, then the client device authenticator 520 of the authentication server 140-d may directly compare the received client public keys to determine if they are linked. If the first client information included the client public key and the client username, and the second client information included the client username, then the client device authenticator 520 of the authentication server 140-d may directly compare the received client usernames to determine if they are linked. If the first client information included the client username, and the second client information included the client username and the client public key, then the client device authenticator 520 of the authentication server 140-d may directly compare the received client usernames to determine if they are linked. If the first client information included a client authentication token and the second client information included the client public key, then the client device authenticator 520 of the authentication server 140-d may derive a token from the received client public key using the same derivation method (e.g., hash function) as used by the client information generator 230 of the client device 115-d. The client device authenticator 520 of the authentication server 140-d may then determine if the derived token matches the client authentication token received in the first client information. If the first client information included the client public key and the second client information included a client ID, then the client device authenticator 520 of the authentication server 140-d may derive a ID from the received client public key using the same derivation method as used by the client information generator 230 of the client device 115-d. The client device authenticator 520 of the authentication server 140-d may then determine if the derived ID matches the client ID received in the second client information.

After the client device authenticator 520 of the authentication server 140-d determines that a link exists between the first client information and the second client information, the network authenticator 525 of the authentication server 140-d may encrypt an authentication credential using the client public key received in either the first client information or the second client information. Alternatively, the network authenticator 525 of the authentication server 140-d may encrypt the authentication credential using a shared secret key exchanged with the client device 115-d using, for example, a Diffie-Hellman key exchange. The shared secret key may be established based in part on the client public key. The authentication credential may provide the client device 115-d the credentials necessary to complete an authentication procedure with the access point 105-d. For example, the authentication credential may be a Wi-Fi Protected Access II (WPA2) Enterprise Network Credential (ENC). The encrypted authentication credential may be transmitted to the access point 105-d via the authentication server network interface 505 of the authentication server 140-d, denoted 650.

The network receiver 425 of the access point 105-d may receive the encrypted authentication credential. The access point 105-d may then transmit the encrypted authentication credential to the client device 115-d via the wireless transmitter 430 of the access point 105-d, denoted 655. The client device 115-d may receive the encrypted authentication credential via the wireless receiver 220 of the client device 115-d.

After receiving the encrypted authentication credential, the client device 115-d may decrypt the encrypted authentication credential using a client private key corresponding to the client public key. Alternatively, the client device 115-d may decrypt the encrypted authentication credential using the shared secret key exchanged with the authentication server 140-d. The network authenticator 240 of the client device 115-d may use the decrypted authentication credential to complete an authentication procedure with the network authenticator 410 of the access point 105-d and the network authenticator 525 of the authentication server 140-d, denoted 670. The authentication procedure may be an IEEE 802.1X Extensible Authentication Protocol (EAP) authentication procedure.

After completing the authentication procedure, the client device 115-d may connect to the access point 105-d with a secure wireless connection, denoted 680. The secure wireless connection may be a WPA2 Enterprise protocol connection.

Figure 7:
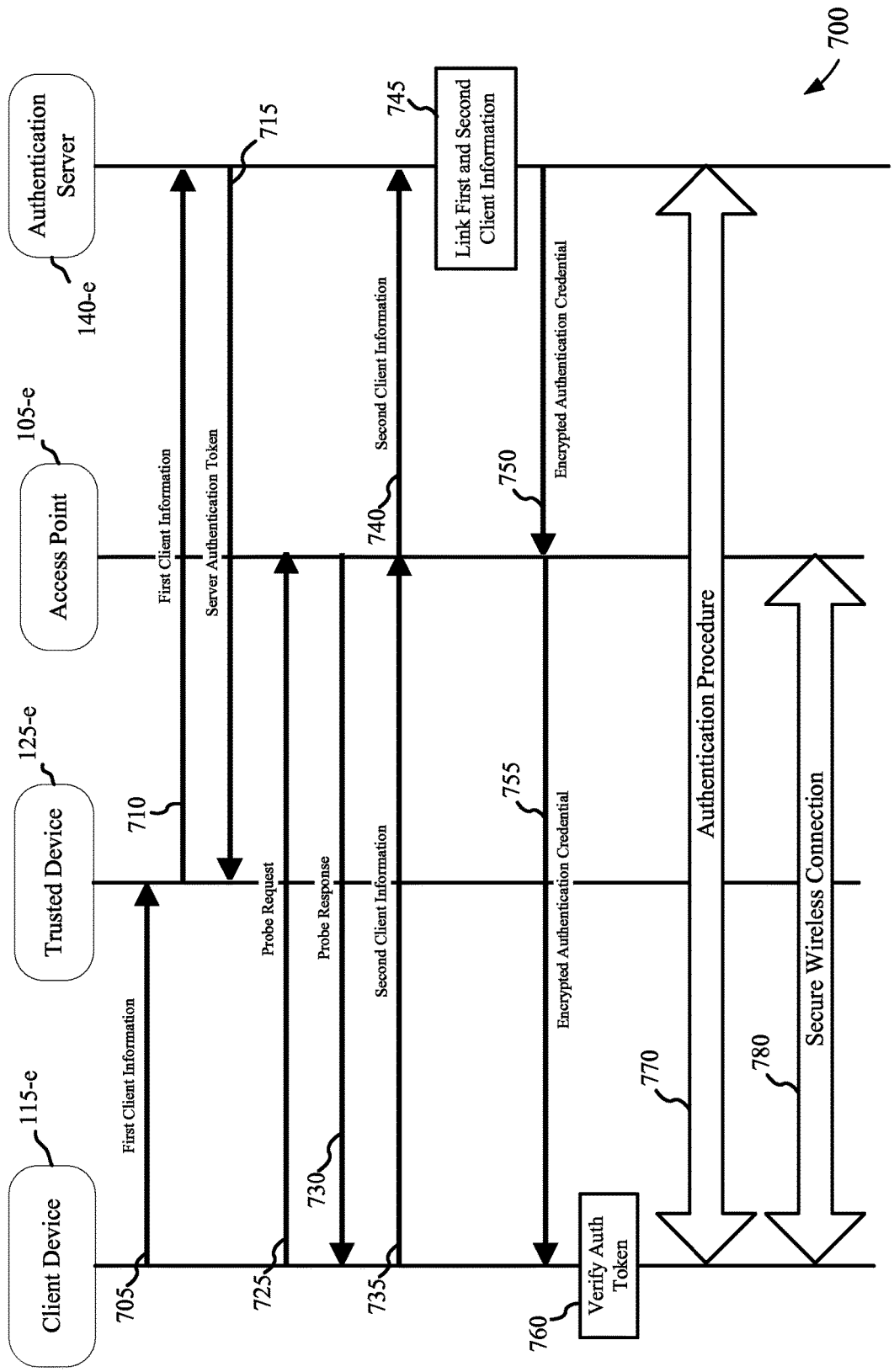
FIG. 7 shows a message flow diagram illustrating another example of communications between a client device, a trusted device, an access point, and an authentication server.

FIG. 7 is a message flow diagram 700 illustrating one example of communications between a client device 115-e, a trusted device 125-e, an access point 105-e, and an authentication server 140-e. The client device 115-e may be an example of the client devices 115 described with reference to FIGS. 1, 2A, 2B, and/or 2C. The trusted device 125-e may be an example of the trusted device 125 described with reference to FIGS. 1, 3A, 3B, and/or 3C. The access point 105-e may be an example of the access point 105 described with reference to FIGS. 1, 4A, 4B, and/or 4C. The authentication server 140-e may be an example of the authentication server 140 described with reference to FIGS. 1 and/or 5.

In one configuration, the client device 115-e may be triggered to output first client information to the trusted device 125-e, denoted 705 in FIG. 7. The first client information may include a client public key, a client username, and/or a client authentication token. The client authentication token may be a string of characters derived from the client public key, such as by calculating a hash of the client public key. The client authentication token may be derived by the client information generator 230 of the client device 115-e. The first client information may be output over the secure interface output 250 of the client device 115-e by, for example, displaying the first client information as text on a display of the client device 115-e, displaying the first client information as a QR code on a display of the client device 115-e, or transmitting the first client information from the client device 115-e via an out-of-band wireless signal such as NFC or Bluetooth. After client device 115-e outputs the first client information, the first client information may be input into the secure interface 135 of the trusted device 125-e. The first client information may be input into secure interface input 320 of the trusted device 125-e by, for example, typing the text displayed on the client device 115-e into a text input interface, scanning the QR code displayed on the client device 115-e with a QR code reader, or receiving the out-of-band wireless signal on an out-of-band wireless input, such as an NFC input or a Bluetooth input.

After the first client information is input into secure interface 135 of the trusted device 125-e, the trusted device 125-e may transmit the first client information, either directly or indirectly, to the authentication server 140-e, denoted 710. The first client information may be transmitted to the authentication server 140-e over the network output 325 of the trusted device 125-e. The transmission may be a wired or wireless transmission, and the transmission may be routed through a router and/or access point, such as access point 105-e. The authentication server 140-e may receive the first client information via the authentication server network interface 505, and may store the received first client information in authentication server memory 510.

After receiving the first client information, the authentication server 140-e may transmit a server authentication token to the trusted device 125-e, denoted 715. The server authentication token may be transmitted to the trusted device 125-e via the authentication server network interface 505 of the authentication server 140-e. The server authentication token may be received by the network input 315 of the trusted device 125-e. The transmission may be a wired or wireless transmission, and the transmission may be routed through a router and/or access point, such as access point 105-e. The server authentication token may be a string of characters derived from an authentication credential of the authentication server 140-e, for example, by calculating a hash of the authentication credential. The server authentication token may be derived by the client device authenticator 520 of the authentication server 140-e. After the trusted device 125-e receives the server authentication token, the trusted device 125-e may store the server authentication token in trusted device memory 340 and display the server authentication token for manual verification.

When the client device 115-e is triggered to output the first client information, the client device 115-e may also be triggered to send a probe request to the access point 105-e, denoted 725. The probe request may be transmitted by the wireless transmitter 245 of the client device 115-e and received by the wireless receiver 420 of the access point 105-e. The access point 105-e may respond to the probe request with a probe response, denoted 730. The probe response may be transmitted by the wireless transmitter 430 of the access point 105-e and received by the wireless receiver 220 of the client device 115-e.

After receiving the probe response from the access point 105-e, the client device 115-e may transmit second client information to the access point 105-e, denoted 735. The second client information may be transmitted by the wireless transmitter 245 of the client device 115-e and received by the wireless receiver 420 of the access point 105-e. The second client information may include the client public key, the client username, and/or a client identification (ID). The client ID may be a value derived from the client public key, such as by calculating a hash of the client public key. The client ID may be derived by the client information generator 230 of the client device 115-e.

After receiving the second client information, the access point 105-e may transmit the second client information to the authentication server 140-e, denoted 740. The second client information may be transmitted by the network transmitter 435 of the access point 105-e and received by the authentication server network interface 505 of the authentication server 140-e. The authentication server 140-e may store the received second client information in the authentication server memory 510.

After receiving the second client information, the client device authenticator 520 of the authentication server 140-e may compare the first client information and the second client information to determine if they are linked, denoted 745. If the first client information included the client public key and the second client information also included the client public key, then the client device authenticator 520 of the authentication server 140-e may directly compare the received client public keys to determine if they are linked. If the first client information included the client public key and the client username, and the second client information included the client username, then the client device authenticator 520 of the authentication server 140-e may directly compare the received client usernames to determine if they are linked. If the first client information included the client username, and the second client information included the client username and the client public key, then the client device authenticator 520 of the authentication server 140-e may directly compare the received client usernames to determine if they are linked. If the first client information included a client authentication token and the second client information included the client public key, then the client device authenticator 520 of the authentication server 140-e may derive a token from the received client public key using the same derivation method as used by the client information generator 230 of the client device 115-e. The client device authenticator 520 of the authentication server 140-e may then determine if the derived token matches the client authentication token received in the first client information. If the first client information included the client public key and the second client information included a client ID, then the client device authenticator 520 of the authentication server 140-e may derive a ID from the received client public key using the same derivation method as used by the client information generator 230 of the client device 115-e. The client device authenticator 520 of the authentication server 140-e may then determine if the derived ID matches the client ID received in the second client information.

After the client device authenticator 520 of the authentication server 140-e determines that a link exists between the first client information and the second client information, the network authenticator 525 of the authentication server 140-e may encrypt an authentication credential using the client public key received in either the first client information or the second client information. Alternatively, the network authenticator 525 of the authentication server 140-e may encrypt the authentication credential using a shared secret key exchanged with the client device 115-e using, for example, a Diffie-Hellman key exchange. The shared secret key may be established based in part on the client public key. The authentication credential may provide the client device 115-e the credentials necessary to complete an authentication procedure with the access point 105-e. For example, the authentication credential may be a WPA2 ENC. The encrypted authentication credential may be transmitted to the access point 105-e via the authentication server network interface 505 of the authentication server 140-e, denoted 750.

The network receiver 425 of the access point 105-e may receive the encrypted authentication credential. The access point 105-e may then transmit the encrypted authentication credential to the client device 115-e via the wireless transmitter 430 of the access point 105-e, denoted 755. The client device 115-e may receive the encrypted authentication credential via the wireless receiver 220 of the client device 115-e.

After receiving the encrypted authentication credential, the client device 115-e may decrypt the encrypted authentication credential using a client private key corresponding to the client public key. Alternatively, the client device 115-e may decrypt the encrypted authentication credential using the shared secret key exchanged with the authentication server 140-e. The server authenticator 235 of the client device 115-e may derive a token from the decrypted authentication credential using the same derivation method the client device authenticator 520 of the authentication server 140-e used to derive the server authentication token. The client device 115-e may then display the derived token for a user to manually verify if the derived token matches the server authentication token displayed by the trusted device 125-e, denoted 760. The derived token matching the server authentication token may verify to the user that the received authentication credential is from the authentication server 140-e that received the first client information from the trusted device 125-e.

After decrypting and verifying the received authentication credential, the network authenticator 240 of the client device 115-e may use the decrypted authentication credential to complete an authentication procedure with the network authenticator 410 of the access point 105-e and the network authenticator 525 of the authentication server 140-e, denoted 770. The authentication procedure may be an IEEE 802.1X EAP authentication procedure.

After completing the authentication procedure, the client device 115-e may connect to the access point 105-e with a secure wireless connection, denoted 780. The secure wireless connection may be a WPA2 Enterprise protocol connection.

Figure 8:
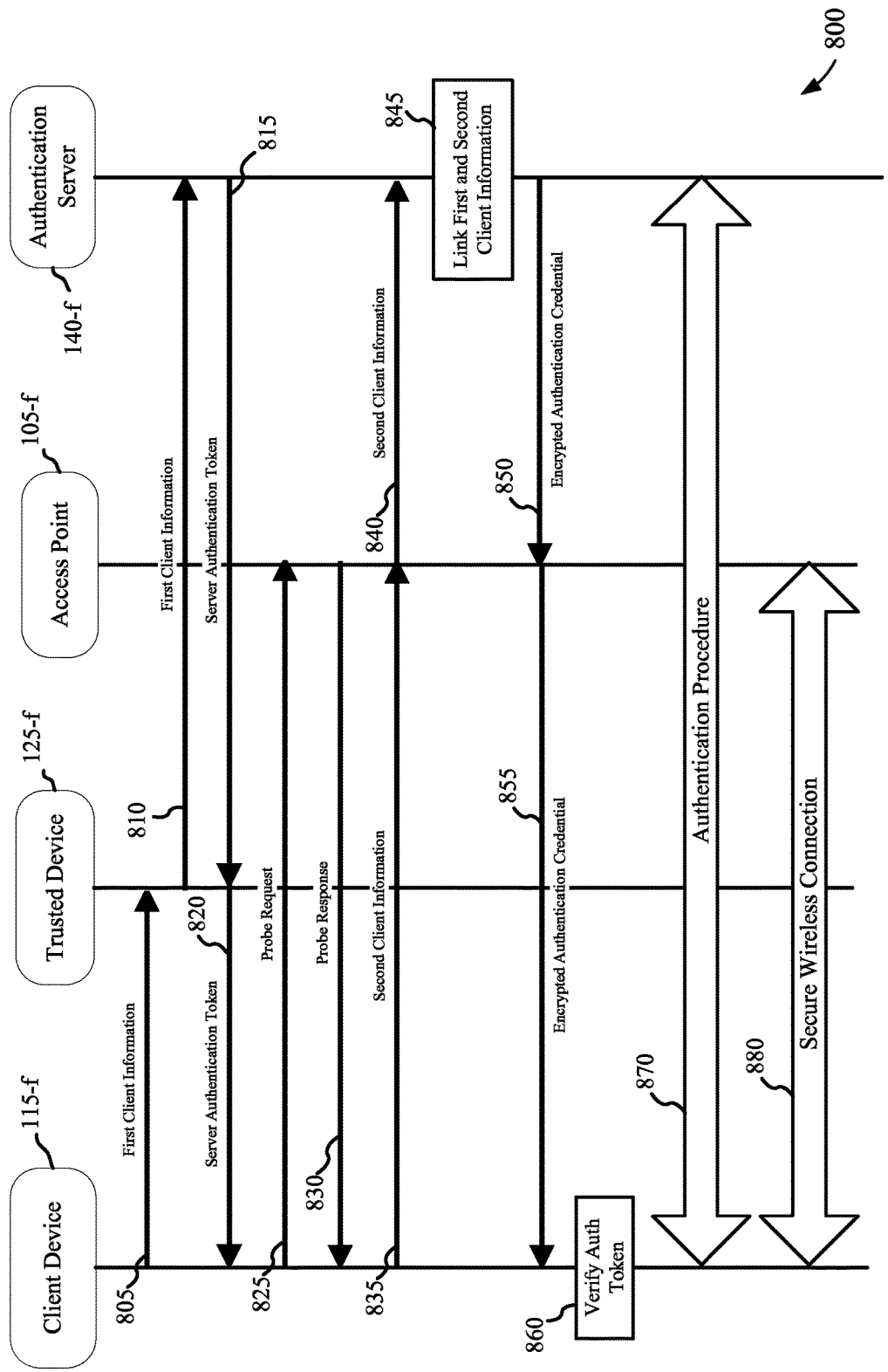
FIG. 8 shows a message flow diagram illustrating another example of communications between a client device, a trusted device, an access point, and an authentication server.

FIG. 8 is a message flow diagram 800 illustrating one example of communications between a client device 115-f, a trusted device 125-f, an access point 105-f, and an authentication server 140-f. The client device 115-f may be an example of the client devices 115 described with reference to FIGS. 1, 2A, 2B, and/or 2C. The trusted device 125-f may be an example of the trusted device 125 described with reference to FIGS. 1, 3A, 3B, and/or 3C. The access point 105-f may be an example of the access point 105 described with reference to FIGS. 1, 4A, 4B, and/or 4C. The authentication server 140-f may be an example of the authentication server 140 described with reference to FIGS. 1 and/or 5.

In one configuration, the client device 115-f may be triggered to output first client information to the trusted device 125-f, denoted 805 in FIG. 8. The first client information may include a client public key, a client username, and/or a client authentication token. The client authentication token may be a string of characters derived from the client public key, such as by calculating a hash of the client public key. The client authentication token may be derived by the client information generator 230 of the client device 115-f. The first client information may be output over the secure interface output 250 of the client device 115-f by, for example, displaying the first client information as text on a display of the client device 115-f, displaying the first client information as a QR code on a display of the client device 115-f, or transmitting the first client information from the client device 115-f via an out-of-band wireless signal such as NFC or Bluetooth. After client device 115-f outputs the first client information, the first client information may be input into the secure interface 135 of the trusted device 125-f. The first client information may be input into secure interface input 320 of the trusted device 125-f by, for example, typing the text displayed on the client device 115-f into a text input interface, scanning the QR code displayed on the client device 115-f with a QR code reader, or receiving the out-of-band wireless signal on an out-of-band wireless input, such as an NFC input or a Bluetooth input.

After the first client information is input into secure interface 135 of the trusted device 125-f, the trusted device 125-f may transmit the first client information, either directly or indirectly, to the authentication server 140-f, denoted 810. The first client information may be transmitted to the authentication server 140-f over the network output 325 of the trusted device 125-f. The transmission may be a wired or wireless transmission, and the transmission may be routed through a router and/or access point, such as access point 105-f. The authentication server 140-f may receive the first client information via the authentication server network interface 505, and may store the received first client information in authentication server memory 510.

After receiving the first client information, the authentication server 140-f may transmit a server authentication token to the trusted device 125-f, denoted 815. The server authentication token may be transmitted to the trusted device 125-f via the authentication server network interface 505 of the authentication server 140-f. The server authentication token may be received by the network input 315 of the trusted device 125-f. The transmission may be a wired or wireless transmission, and the transmission may be routed through a router and/or access point, such as access point 105-f. The server authentication token may be a string of characters derived from an authentication credential of the authentication server 140-f, for example, by calculating a hash of the authentication credential. The server authentication token may be derived by the client device authenticator 520 of the authentication server 140-f.

After the trusted device 125-f receives the server authentication token, the trusted device 125-f may output the server authentication token to the client device 115-f, denoted 820. The server authentication token may be output over the secure interface output 330 of the trusted device 125-f by, for example, displaying the server authentication token as text on a display of the trusted device 125-f, displaying the server authentication token as a QR code on a display of the trusted device 125-f, or transmitting the server authentication token from the trusted device 125-f via an out-of-band wireless signal such as NFC or Bluetooth. After the trusted device 125-f outputs the server authentication token, the server authentication token may be input into the client device 115-f. The server authentication token may be input into secure interface input 225 of the client device 115-f by, for example, typing the text displayed on the trusted device 125-f into a text input interface, scanning the QR code displayed on the trusted device 125-f with a QR code reader, or receiving the out-of-band wireless signal on an out-of-band wireless input, such as an NFC input or a Bluetooth input. The client device 115-f may store the server authentication token in client device memory 260.

When the client device 115-f is triggered to output the first client information, the client device 115-f may also be triggered to send a probe request to the access point 105-f, denoted 825. The probe request may be transmitted by the wireless transmitter 245 of the client device 115-f and received by the wireless receiver 420 of the access point 105-f. The access point 105-f may respond to the probe request with a probe response, denoted 830. The probe response may be transmitted by the wireless transmitter 430 of the access point 105-f and received by the wireless receiver 220 of the client device 115-f.

After receiving the probe response from the access point 105-f, the client device 115-f may transmit second client information to the access point 105-f, denoted 835. The second client information may be transmitted by the wireless transmitter 245 of the client device 115-f and received by the wireless receiver 420 of the access point 105-f. The second client information may include the client public key, the client username, and/or a client identification (ID). The client ID may be a value derived from the client public key, such as by calculating a hash of the client public key. The client ID may be derived by the client information generator 230 of the client device 115-f.

After receiving the second client information, the access point 105-f may transmit the second client information to the authentication server 140-f, denoted 840. The second client information may be transmitted by the network transmitter 435 of the access point 105-f and received by the authentication server network interface 505 of the authentication server 140-*f*. The authentication server 140-*f* may store the received second client information in the authentication server memory 510.

After receiving the second client information, the client device authenticator 520 of the authentication server 140-*f* may compare the first client information and the second client information to determine if they are linked, denoted 845. If the first client information included the client public key and the second client information also included the client public key, then the client device authenticator 520 of the authentication server 140-*f* may directly compare the received client public keys to determine if they are linked. If the first client information included the client public key and the client username, and the second client information included the client username, then the client device authenticator 520 of the authentication server 140-*f* may directly compare the received client usernames to determine if they are linked. If the first client information included the client username, and the second client information included the client username and the client public key, then the client device authenticator 520 of the authentication server 140-*f* may directly compare the received client usernames to determine if they are linked. If the first client information included a client authentication token and the second client information included the client public key, then the client device authenticator 520 of the authentication server 140-*f* may derive a token from the received client public key using the same derivation method as used by the client information generator 230 of the client device 115-*f*. The client device authenticator 520 of the authentication server 140-*f* may then determine if the derived token matches the client authentication token received in the first client information. If the first client information included the client public key and the second client information included a client ID, then the client device authenticator 520 of the authentication server 140-*f* may derive a ID from the received client public key using the same derivation method as used by the client information generator 230 of the client device 115-*f*. The client device authenticator 520 of the authentication server 140-*f* may then determine if the derived ID matches the client ID received in the second client information.

After the client device authenticator 520 of the authentication server 140-*f* determines that a link exists between the first client information and the second client information, the network authenticator 525 of the authentication server 140-*f* may encrypt an authentication credential using the client public key received in either the first client information or the second client information. Alternatively, the network authenticator 525 of the authentication server 140-*f* may encrypt the authentication credential using a shared secret key exchanged with the client device 115-*f*. The shared secret key may be established based in part on the client public key. The authentication credential may provide the client device 115-*f* the credentials necessary to complete an authentication procedure with the access point 105-*f*. For example, the authentication credential may be a WPA2 ENC. The encrypted authentication credential may be transmitted to the access point 105-*f* via the authentication server network interface 505 of the authentication server 140-*f*, denoted 850.

The network receiver 425 of the access point 105-*f* may receive the encrypted authentication credential. The access point 105-*f* may then transmit the encrypted authentication credential to the client device 115-*f* via the wireless transmitter 430 of the access point 105-*f*, denoted 855. The client device 115-*f* may receive the encrypted authentication credential via the wireless receiver 220 of the client device 115-*f*.

After receiving the encrypted authentication credential, the client device 115-*f* may decrypt the encrypted authentication credential using a client private key corresponding to the client public key. Alternatively, the client device 115-*f* may decrypt the encrypted authentication credential using the shared secret key exchanged with the authentication server 140-*f*. The server authenticator 235 of the client device 115-*f* may derive a token from the decrypted authentication credential using the same derivation method the client device authenticator 520 of the authentication server 140-*f* used to derive the server authentication token. The server authenticator 235 of the client device 115-*f* may then verify if the derived token matches the server authentication token output by secure interface 135 of the trusted device 125-*f*, denoted 860. The derived token matching the server authentication token may verify to the client device 115-*f* that the received authentication credential is from the authentication server 140-*f* that received the first client information from the trusted device 125-*f*.

After decrypting and verifying the received authentication credential, the network authenticator 240 of the client device 115-*f* may use the decrypted authentication credential to complete an authentication procedure with the network authenticator 410 of the access point 105-*f* and the network authenticator 525 of the authentication server 140-*f*, denoted 870. The authentication procedure may be an IEEE 802.1X EAP authentication procedure.

After completing the authentication procedure, the client device 115-*f* may connect to the access point 105-*f* with a secure wireless connection, denoted 880. The secure wireless connection may be a WPA2 Enterprise protocol connection.

In some embodiments, the trusted device 125 may act as a temporary access point. In these embodiments, the trusted device 125 and access point 105 described with reference to FIGS. 1, 3A, 3B, 3C, 4A, 4B, 4C, 6, 7, and/or 8 may be the same device. In these embodiments, the transmissions to and from the access point 105 may be to and from the trusted device 125.

Figure 9:
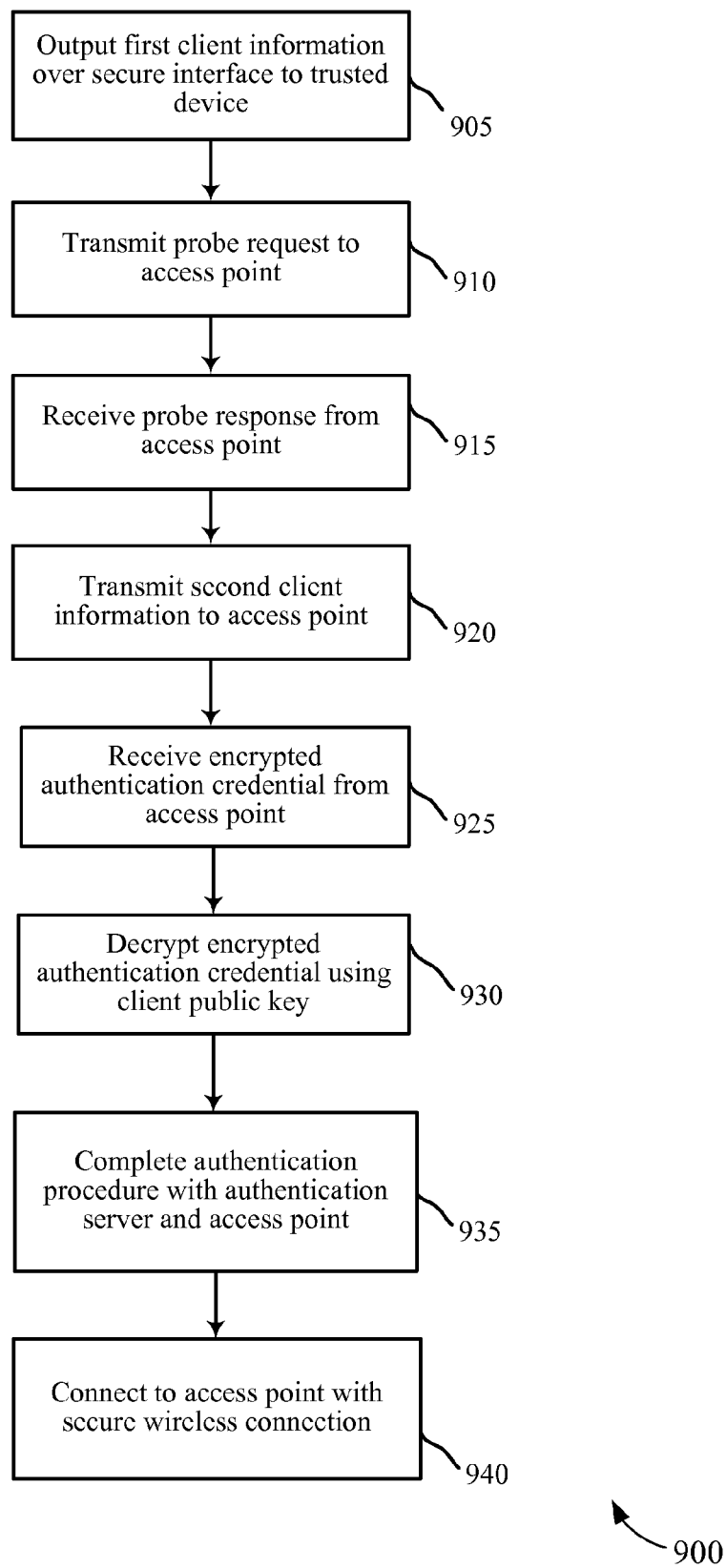
FIG. 9 shows a flowchart illustrating an embodiment of a method performed by a client device for securely connecting to an access point.

FIG. 9 is a flowchart illustrating an embodiment of a method 900 performed by a client device 115 for securely connecting to an access point 105. For clarity, the method 900 is described below with reference to the message flow diagram 600 shown in FIG. 6, and/or with reference to one of the client devices 115 described with reference to FIGS. 1, 2A, 2B, 2C, and/or 6. In one implementation, the client device processor 255 described with reference to FIG. 2C may execute sets of codes to control the functional elements of a client device 115 to perform the functions described below.

In one embodiment, at block 905, the client device 115 may output first client information over a secure interface to a trusted device 125. The secure interface may include at least one of displaying text of the first client information, displaying a QR code of the first client information, and transmitting the first client information over an out-of-band wireless channel. The first client information may include a client public key, a client username, and/or a client authentication token derived from the client public key. At block 910, the client device 115 may transmit a probe request to an access point 105. At block 915, the client device 115 may receive a probe response from the access point 105. At block 920, the client device 115 may transmit second client information to the access point 105. The second client information may include the client public key, the client username, and/or a client ID derived from the client public key. At block 925, the client device 115 may receive an encrypted authentication credential from the access point 105. At block 930, the client device 115 may decrypt the encrypted authentication credential using client private key corresponding to the client public key. Alternatively, the client device 115 may decrypt the encrypted authentication credential using a shared secret key exchanged with an authentication server 140 using, for example, a Diffie-Hellman key exchange. At block 935, the client device 115 may complete an authentication procedure using the decrypted authentication credential with an authentication server 140 and the access point 105. The authentication procedure may be an IEEE 802.1X EAP authentication procedure. At block 940, the client device 115 may connect to the access point 105 with a secure wireless connection. The secure wireless connection may be a WPA2 Enterprise connection.

Figure 10:
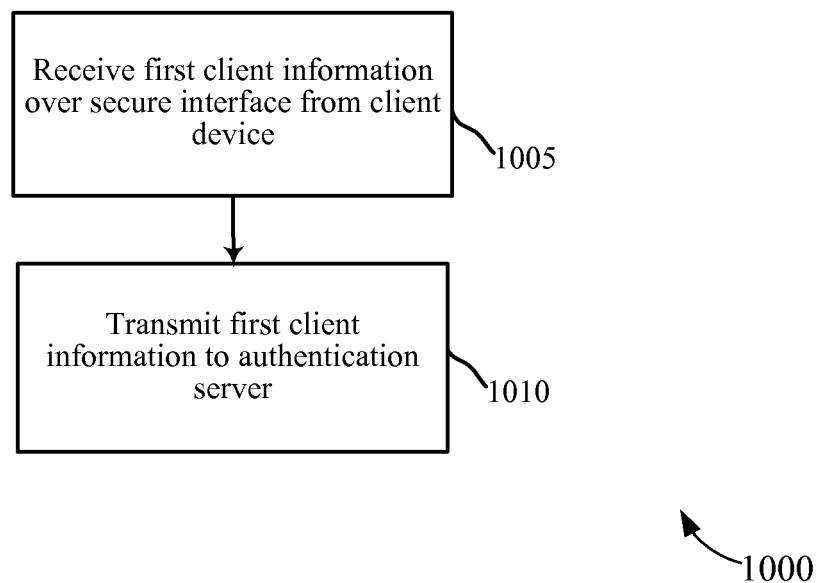
FIG. 10 shows a flowchart illustrating an embodiment of a method performed by a trusted device for securely authenticating a client device.

FIG. 10 is a flowchart illustrating an embodiment of a method 1000 performed by a trusted device 125 for securely authenticating a client device 115. The method 1000 is described below with reference to the message flow diagram 600 shown in FIG. 6, and/or with reference to one of the trusted devices 125 described with reference to FIGS. 1, 3A, 3B, 3C, and/or 6. In one implementation, the trusted device processor 335 described with reference to FIG. 3C may execute sets of codes to control the functional elements of a trusted device 125 to perform the functions described below.

In one embodiment, at block 1005, a trusted device 125 may receive first client information over a secure interface from a client device 115. The secure interface may include at least one of manually entering the first client information, scanning a QR code of the first client information, and receiving the first client information over an out-of-band wireless channel. At block 1010, the trusted device 125 may transmit the first client information to an authentication server 140.

Figure 11:
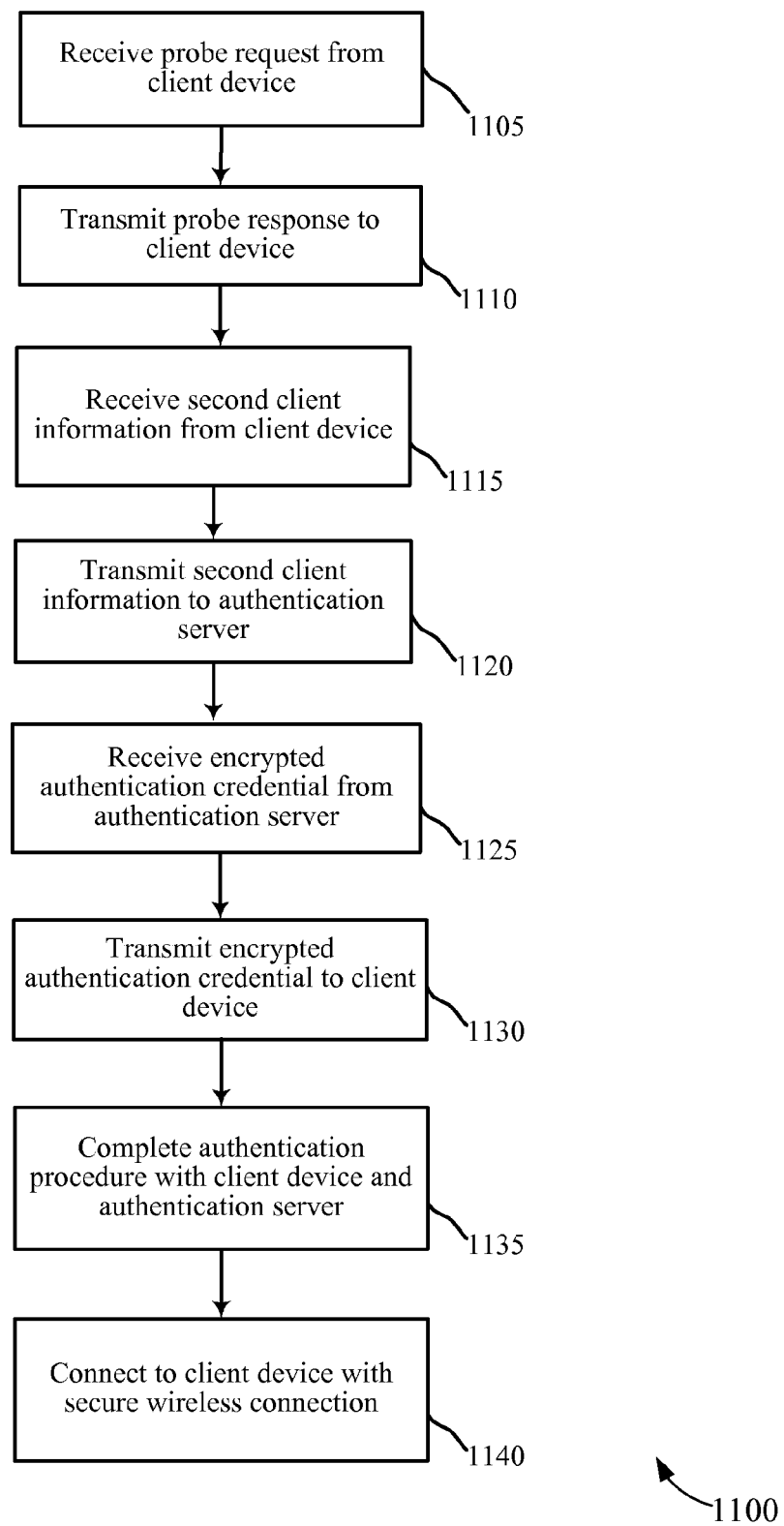
FIG. 11 shows a flowchart illustrating an embodiment of a method performed by an access point for securely connecting to a client device.

FIG. 11 is a flowchart illustrating an embodiment of a method 1100 performed by an access point 105 for securely connecting to a client device 115. The method 1100 is described below with reference to the message flow diagram 600 shown in FIG. 6, and/or with reference to one of the access points 105 described with reference to FIGS. 1, 4A, 4B, 4C, and/or 6. In one implementation, the access point processor 455 described with reference to FIG. 4C may execute sets of codes to control the functional elements of an access point 105 to perform the functions described below.

In one embodiment, at block 1105, an access point 105 may receive a probe request from a client device 115. At block 1110, the access point 105 may transmit a probe response to the client device 115. At block 1115, the access point 105 may receive second client information from the client device 115. At block 1120, the access point 105 may transmit the second client information to an authentication server 140. At block 1125, the access point 105 may receive an encrypted authentication credential from the authentication server 140. At block 1130, the access point 105 may transmit the encrypted authentication credential to the client device 115. At block 1135, the access point may complete an authentication procedure with the client device 115 and the authentication server 140. The authentication procedure may be an IEEE 802.1X EAP authentication procedure. At block 1140, the access point 105 may connect to the client device 115 with a secure wireless connection. The secure wireless connection may be a WPA2 Enterprise connection.

Figure 12:
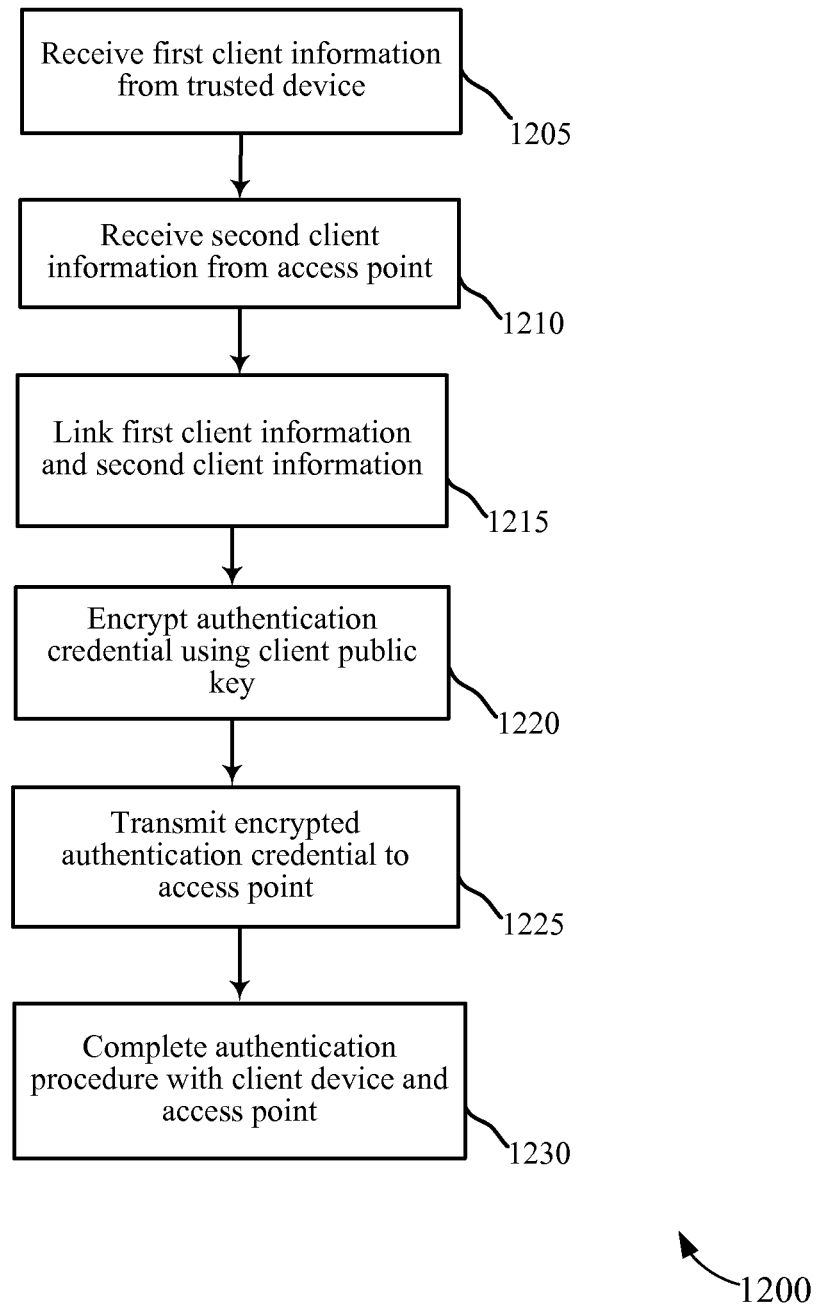
FIG. 12 shows a flowchart illustrating an embodiment of a method performed by an authentication server for authenticating a client device.

FIG. 12 is a flowchart illustrating an embodiment of a method 1200 performed by an authentication server 140 for authenticating a client device 115. The method 1200 is described below with reference to the message flow diagram 600 shown in FIG. 6, and/or with reference to one of the authentication servers 140 described with reference to FIGS. 1, 5, and/or 6. In one implementation, the authentication server processor 515 described with reference to FIG. 5 may execute sets of codes to control the functional elements of an authentication server 140 to perform the functions described below.

In one embodiment, at block 1205, an authentication server 140 may receive first client information from a trusted device 125. At block 1210, the authentication server 140 may receive second client information from an access point 105. At block 1215, the authentication server 140 may link the first client information and the second client information. At block 1220, the authentication server 140 may encrypt an authentication credential using a client public key retrieved from the first client information or the second client information. Alternatively, the authentication server 140 may encrypt an authentication credential using the shared secret key exchanged with the client device 115. The shared secret key may be established based in part on the client public key. The authentication credential may be a WPA2 ENC. At block 1225, the authentication server 140 may transmit the encrypted authentication credential to the access point 105. At block 1230, the authentication server 140 may complete an authentication procedure with a client device 115 and the access point 105. The authentication procedure may be an IEEE 802.1X EAP authentication procedure.

Figure 13:
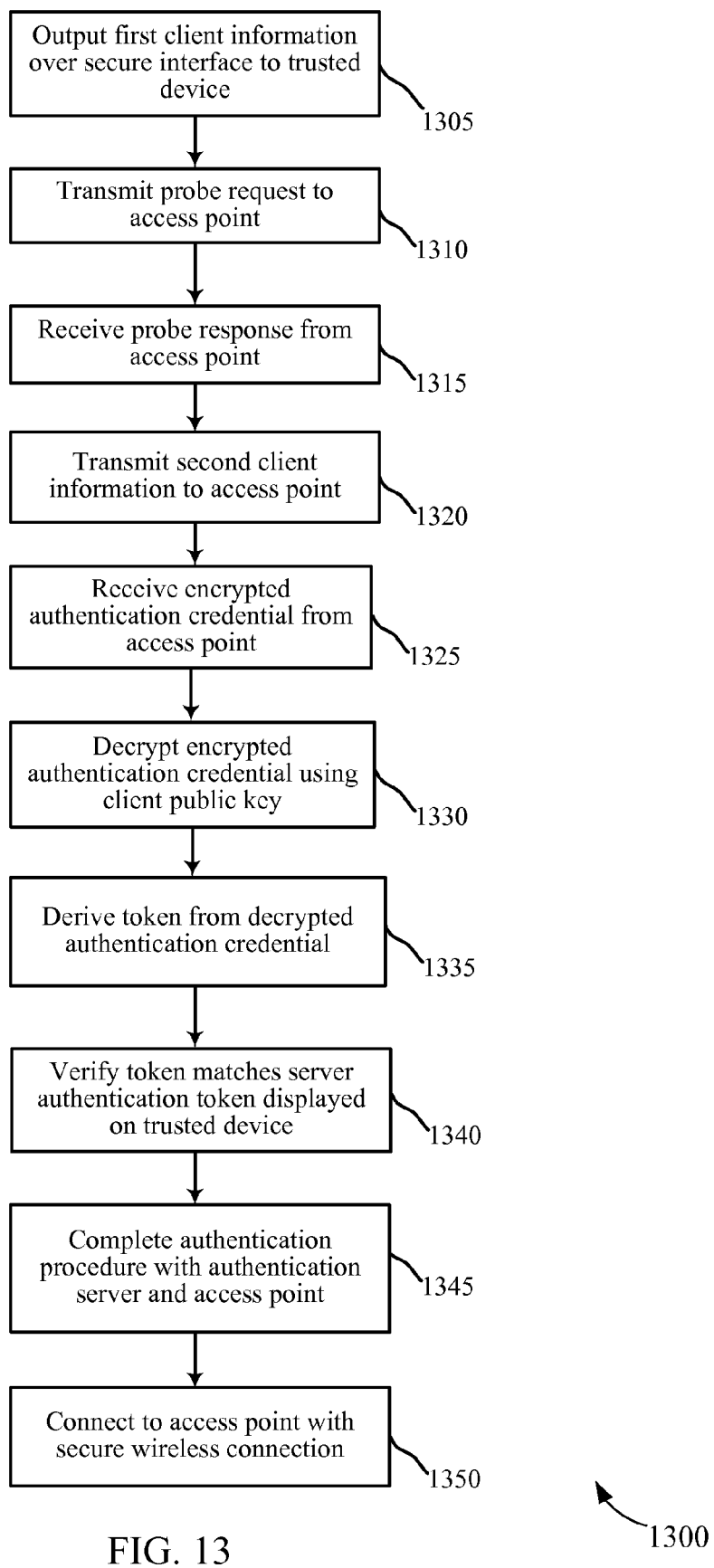
FIG. 13 shows a flowchart illustrating an alternative embodiment of a method performed by a client device for securely connecting to an access point.

FIG. 13 is a flowchart illustrating an alternative embodiment of a method 1300 performed by a client device 115 for securely connecting to an access point 105. The method 1300 is described below with reference to the message flow diagram 700 shown in FIG. 7, and/or with reference to one of the client devices 115 described with reference to FIGS. 1, 2A, 2B, 2C, and/or 7. In one implementation, the client device processor 255 described with reference to FIG. 2C may execute sets of codes to control the functional elements of a client device 115 to perform the functions described below.

In one embodiment, at block 1305, the client device 115 may output first client information over a secure interface to a trusted device 125. The secure interface may include at least one of displaying text of the first client information, displaying a QR code of the first client information, and transmitting the first client information over an out-of-band wireless channel. The first client information may include a client public key, a client username, and/or a client authentication token derived from the client public key. At block 1310, the client device 115 may transmit a probe request to an access point 105. At block 1315, the client device 115 may receive a probe response from the access point 105. At block 1320, the client device 115 may transmit second client information to the access point 105. The second client information may include the client public key, the client username, and/or a client ID derived from the client public key. At block 1325, the client device 115 may receive an encrypted authentication credential from the access point 105. At block 1330, the client device 115 may decrypt the encrypted authentication credential using a client private key corresponding to the client public key. Alternatively, the client device 115 may decrypt the encrypted authentication credential using the shared secret key exchanged with the authentication server 140. At block 1335, the client device 115 may derive a token from the decrypted authentication credential and display the derived token. At block 1340, a user of the client device 115 may verify the derived token matches a server authentication token displayed on the trusted device 125. The derived token matching the server authentication token may verify to the user that the decrypted authentication credential is from the authentication server 140 that received the first client information from the trusted device 125. At block 1345, the client device 115 may complete an authentication procedure using the decrypted authentication credential with an authentication server 140 and the access point 105. The authentication procedure may be an IEEE 802.1X EAP authentication procedure. At block 1350, the client device 115 may connect to the access point 105 with a secure wireless connection. The secure wireless connection may be a WPA2 Enterprise connection.

Figure 14:
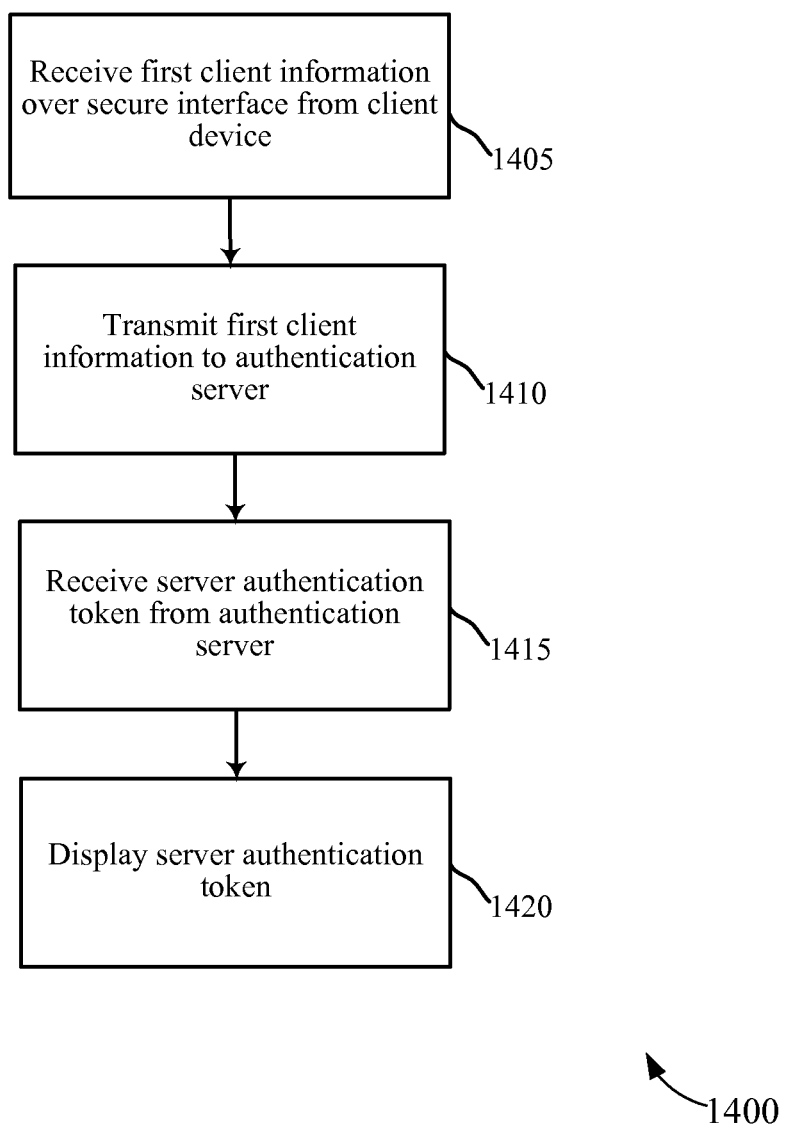
FIG. 14 shows a flowchart illustrating an alternative embodiment of a method performed by a trusted device for securely authenticating a client device.

FIG. 14 is a flowchart illustrating an alternative embodiment of a method 1400 performed by a trusted device 125 for securely authenticating a client device 115. The method 1400 is described below with reference to the message flow diagram 700 shown in FIG. 7, and/or with reference to one of the trusted devices 125 described with reference to FIGS. 1, 3A, 3B, 3C, and/or 7. In one implementation, the trusted device processor 335 described with reference to FIG. 3C may execute sets of codes to control the functional elements of a trusted device 125 to perform the functions described below.

In one embodiment, at block 1405, a trusted device 125 may receive first client information over a secure interface from a client device 115. The secure interface may include at least one of manually entering the first client information, scanning a QR code of the first client information, and receiving the first client information over an out-of-band wireless channel. At block 1410, the trusted device 125 may transmit the first client information to an authentication server 140. At block 1415, the trusted device 125 may receive a server authentication token from the authentication server 140. At block 1420, the trusted device 125 may display the server authentication token for a user to verify.

Figure 15:
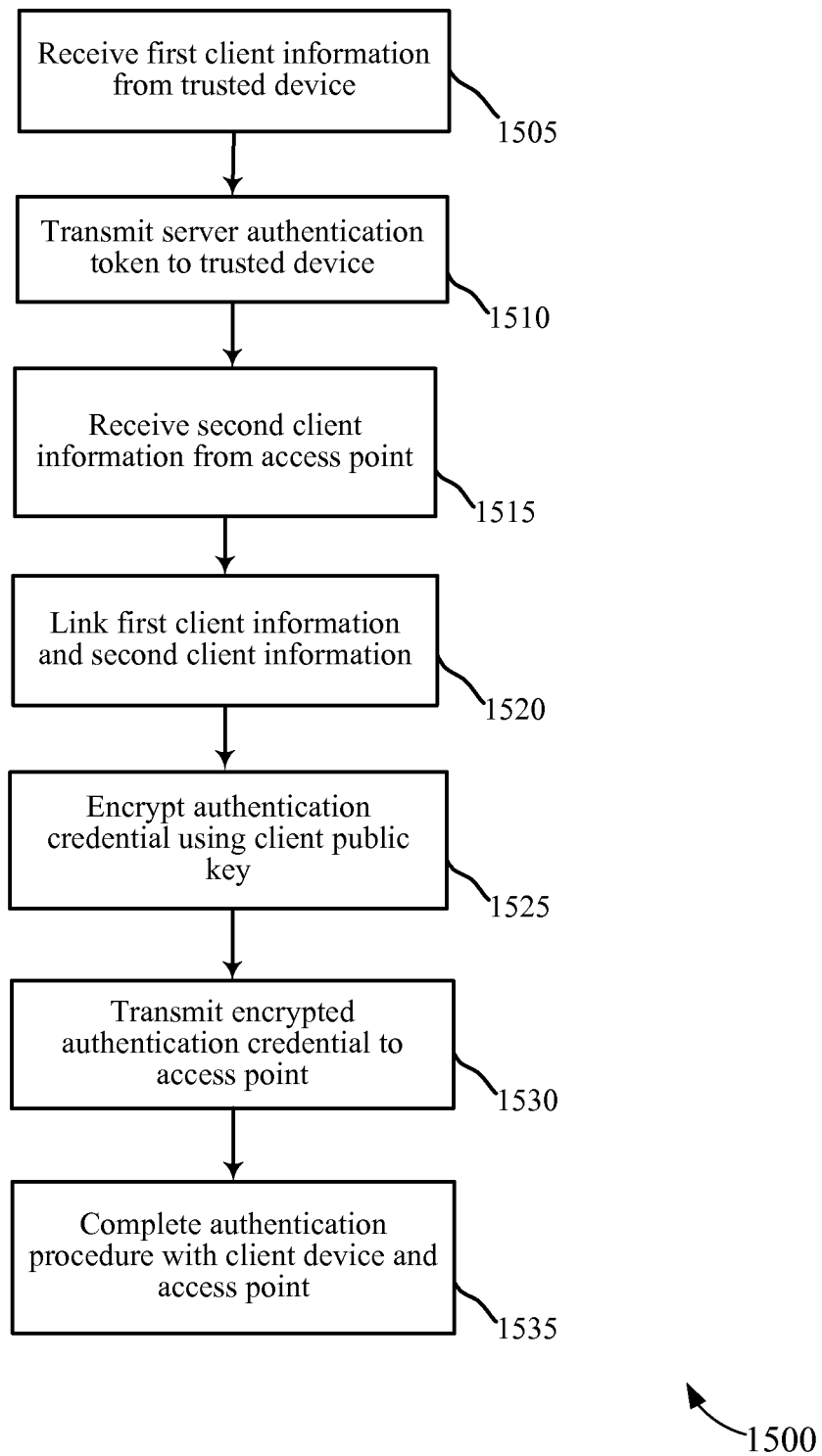
FIG. 15 shows a flowchart illustrating an alternative embodiment of a method performed by an authentication server for authenticating a client device.

FIG. 15 is a flowchart illustrating an alternative embodiment of a method 1500 performed by an authentication server 140 for authenticating a client device 115. The method 1500 is described below with reference to the message flow diagram 700 shown in FIG. 7 and the message flow diagram 800 shown in FIG. 8, and/or with reference to one of the authentication servers 140 described with reference to FIGS. 1, 5, 7, and/or 8. In one implementation, the authentication server processor 515 described with reference to FIG. 5 may execute sets of codes to control the functional elements of an authentication server 140 to perform the functions described below.

In one embodiment, at block 1505, an authentication server 140 may receive first client information from a trusted device 125. At block 1510, the authentication server 140 may transmit a server authentication token to the trusted device 125. The server authentication token may be derived from an authentication credential of the authentication server 140. At block 1515, the authentication server 140 may receive second client information from an access point 105. At block 1520, the authentication server 140 may link the first client information and the second client information. At block 1525, the authentication server 140 may encrypt the authentication credential using a client public key retrieved from the first client information or the second client information. Alternatively, the authentication server 140 may encrypt the authentication credential using a shared secret key exchanged with the client device 115. The shared secret key may be established based in part on the client public key. The authentication credential may be a WPA2 ENC. At block 1530, the authentication server 140 may transmit the encrypted authentication credential to the access point 105. At block 1535, the authentication server 140 may complete an authentication procedure with a client device 115 and the access point 105. The authentication procedure may be an IEEE 802.1X EAP authentication procedure.

Figure 16:
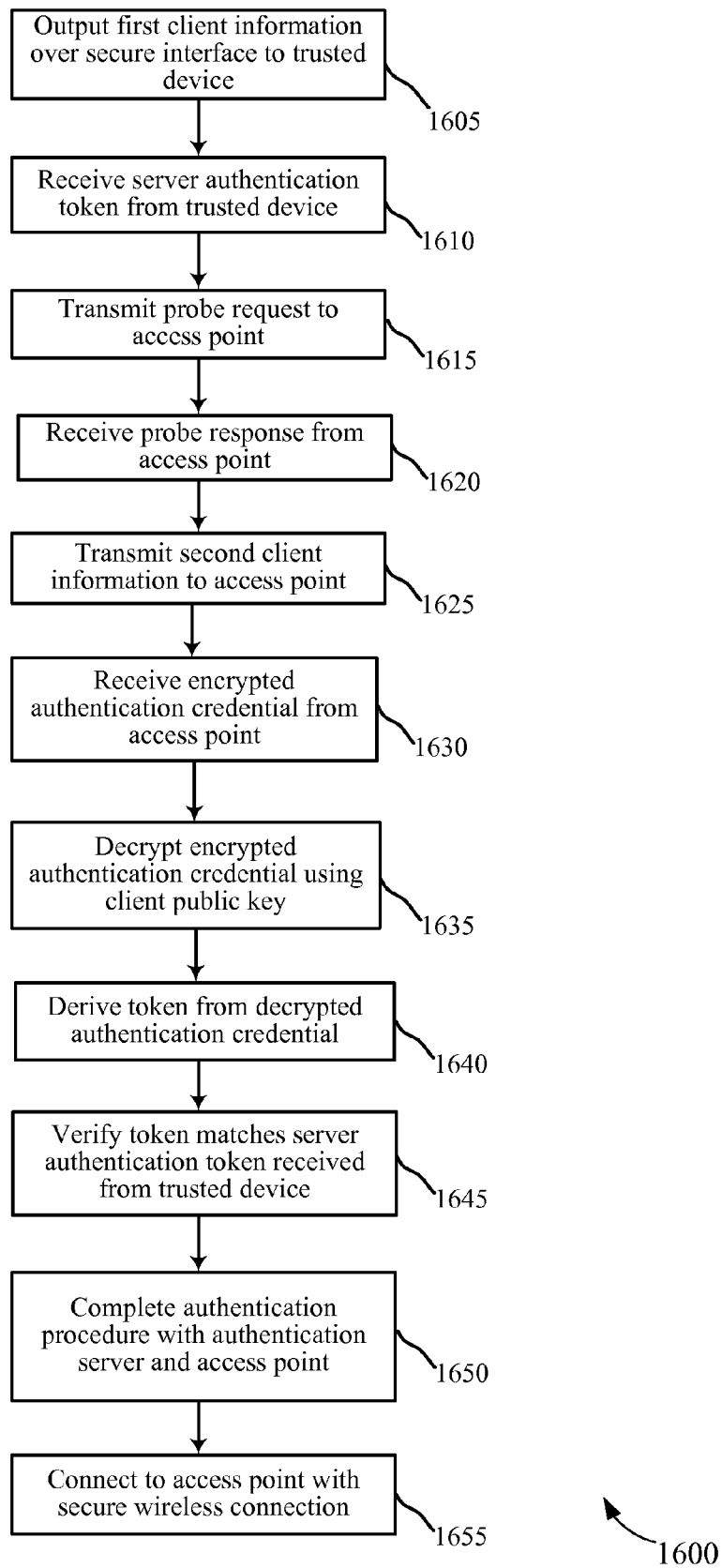
FIG. 16 shows a flowchart illustrating an alternative embodiment of a method performed by a client device for securely connecting to an access point.

FIG. 16 is a flowchart illustrating an alternative embodiment of a method 1600 performed by a client device 115 for securely connecting to an access point 105. The method 1600 is described below with reference to the message flow diagram 800 shown in FIG. 8, and/or with reference to one of the client devices 115 described with reference to FIGS. 1, 2A, 2B, 2C, and/or 8. In one implementation, the client device processor 255 described with reference to FIG. 2C may execute sets of codes to control the functional elements of a client device 115 to perform the functions described below.

In one embodiment, at block 1605, the client device 115 may output first client information over a secure interface to a trusted device 125. The secure interface may include at least one of displaying text of the first client information, displaying a QR code of the first client information, and transmitting the first client information over an out-of-band wireless channel. The first client information may include a client public key, a client username, and/or a client authentication token derived from the client public key. At block 1610, the client device 115 may receive a server authentication token from the trusted device 125. At block 1615, the client device 115 may transmit a probe request to an access point 105. At block 1620, the client device 115 may receive a probe response from the access point 105. At block 1625, the client device 115 may transmit second client information to the access point 105. The second client information may include the client public key, the client username, and/or a client ID derived from the client public key. At block 1630, the client device 115 may receive an encrypted authentication credential from the access point 105. At block 1635, the client device 115 may decrypt the encrypted authentication credential using a client private key corresponding to the client public key. Alternatively, the client device 115 may decrypt the encrypted authentication credential using the shared secret key exchanged with the authentication server 140. At block 1640, the client device 115 may derive a token from the decrypted authentication credential. At block 1645, the client device 115 may verify the derived token matches the server authentication token received from the trusted device 125. The derived token matching the server authentication token may verify to the client device 115 that the decrypted authentication credential is from the authentication server 140 that received the first client information from the trusted device 125. At block 1650, the client device 115 may complete an authentication procedure using the decrypted authentication credential with an authentication server 140 and the access point 105. The authentication procedure may be an IEEE 802.1X EAP authentication procedure. At block 1655, the client device 115 may connect to the access point 105 with a secure wireless connection. The secure wireless connection may be a WPA2 Enterprise connection.

Figure 17:
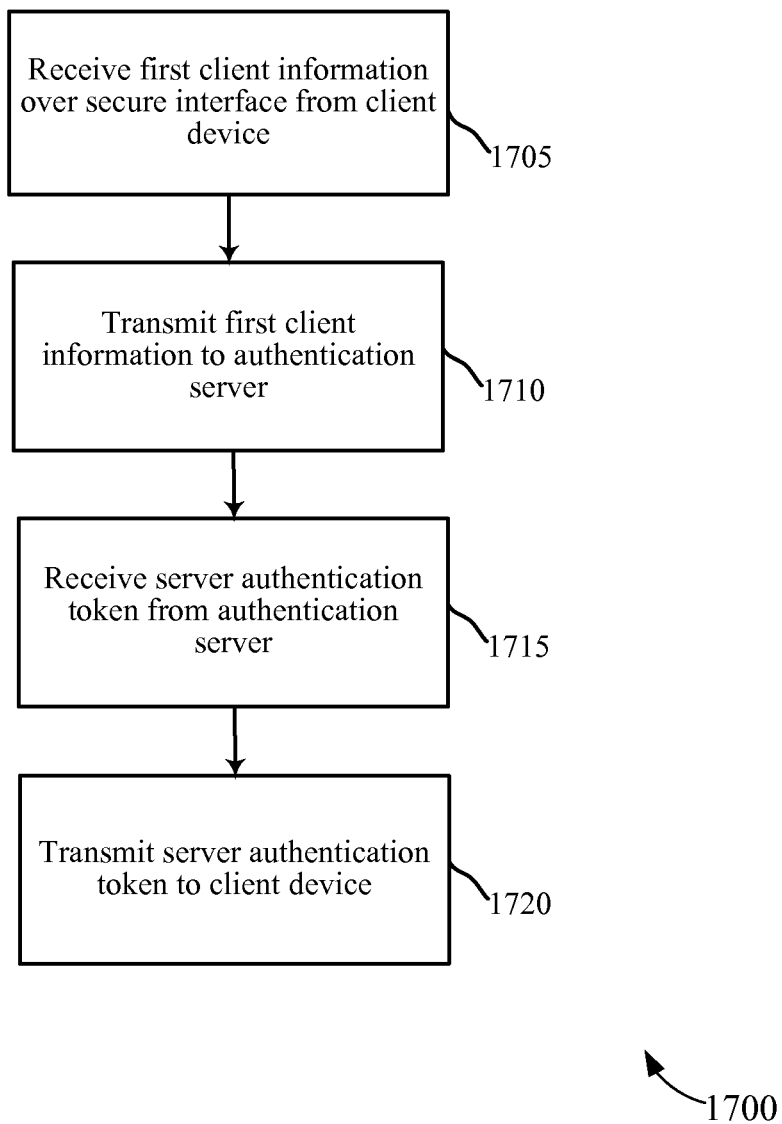
FIG. 17 shows a flowchart illustrating an alternative embodiment of a method performed by a trusted device for securely authenticating a client device.

FIG. 17 is a flowchart illustrating an alternative embodiment of a method 1700 performed by a trusted device 125 for securely authenticating a client device 115. The method 1700 is described below with reference to the message flow diagram 800 shown in FIG. 8, and/or with reference to one of the trusted devices 125 described with reference to FIGS.

1, 3A, 3B, 3C, and/or 8. In one implementation, the trusted device processor 335 described with reference to FIG. 3C may execute sets of codes to control the functional elements of a trusted device 125 to perform the functions described below.

In one embodiment, at block 1705, a trusted device 125 may receive first client information over a secure interface from a client device 115. The secure interface may include at least one of manually entering the first client information, scanning a QR code of the first client information, and receiving the first client information over an out-of-band wireless channel. At block 1710, the trusted device 125 may transmit the first client information to an authentication server 140. At block 1715, the trusted device 125 may receive a server authentication token from the authentication server 140. At block 1720, the trusted device 125 may transmit the server authentication token to the client device 115 for the client device to verify the authenticity of the authentication server 140.

Figure 18:
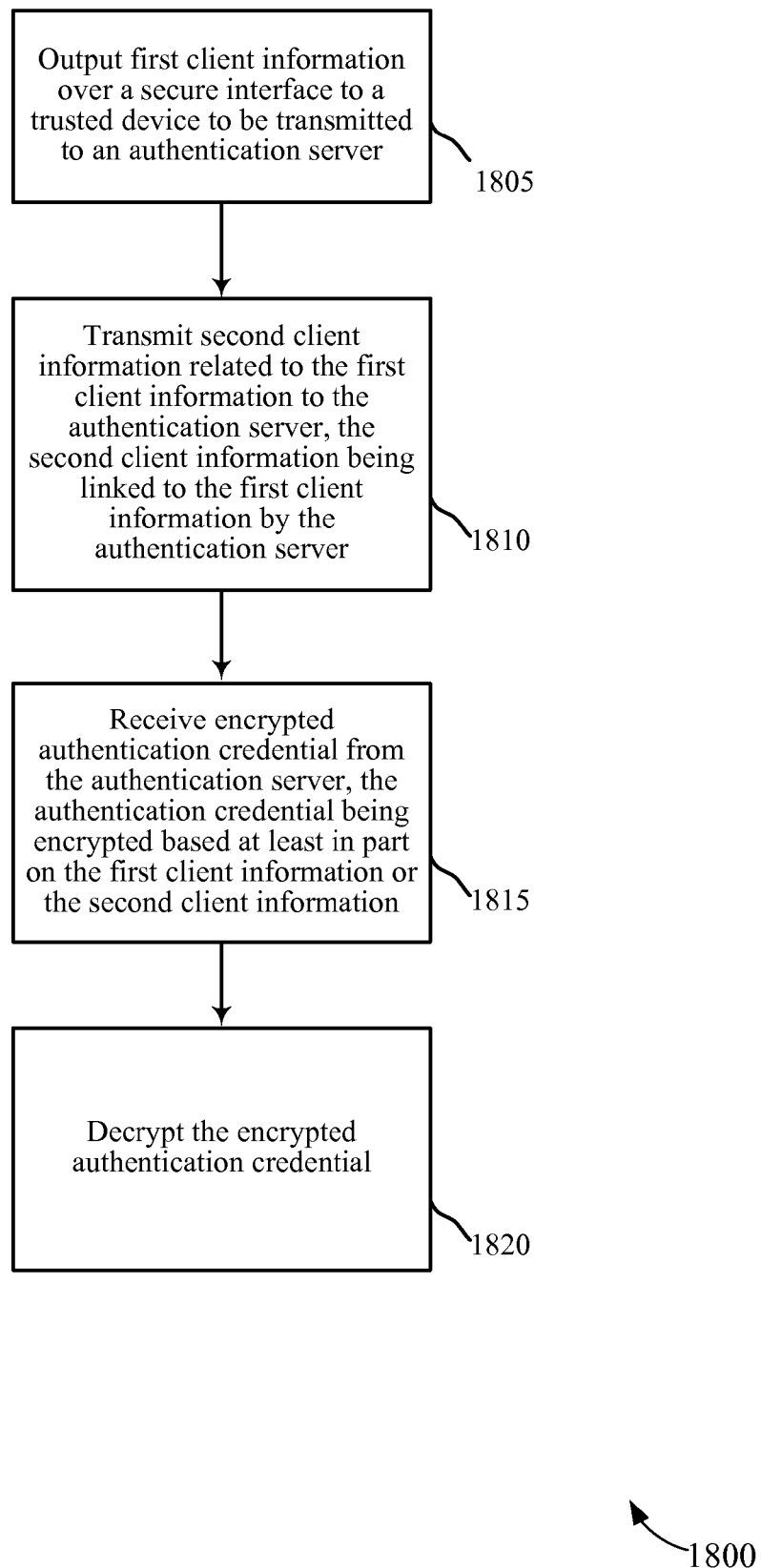
FIG. 18 shows a flowchart illustrating an embodiment of a method for securely provisioning a client device with an authentication credential.

FIG. 18 is a flowchart illustrating an embodiment of a method 1800 for securely provisioning a client device 115 with an authentication credential. For clarity, the method 1800 is described below with reference to the flowcharts shown in FIGS. 9, 10, 11, and 12, and/or with reference to the devices described with reference to FIGS. 1, 2A, 2B, 2C, 3A, 3B, 3C, 4A, 4B, 4C, 5, and/or 6. In one implementation, the client device processor 255 described with reference to FIG. 2C may execute sets of codes to control the functional elements of a client device 115 to perform the functions described below.

In one embodiment, at block 1805, the client device 115 may output first client information over a secure interface to a trusted device 125 to be transmitted to an authentication server 140. The secure interface may include at least one of displaying text of the first client information, displaying a QR code of the first client information, and transmitting the first client information over an out-of-band wireless channel. The first client information may include a client public key, a client username, and/or a client authentication token derived from the client public key. At block 1810, the client device 115 may transmit second client information related to the first client information to the authentication server 140, and the second client information may be linked to the first client information by the authentication server 140. The second client information may include the client public key, the client username, and/or a client ID derived from the client public key. At block 1815, the client device 115 may receive an encrypted authentication credential from the authentication server 140, and the authentication credential may be encrypted based at least in part on the first client information or the second client information. At block 1820, the client device 115 may decrypt the encrypted authentication credential using the first client information or the second client information. The client device 115 may then complete an authentication procedure using the decrypted authentication credential with the authentication server 140 and the access point 105, and connect to the access point 105 with a secure wireless connection. The authentication procedure may be an IEEE 802.1X EAP authentication procedure. The secure wireless connection may be a WPA2 Enterprise connection.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for securely provisioning a client device, comprising:
   outputting first client information over a secure interface to a trusted device authorized by the authentication server, to be transmitted from the trusted device to an authentication server;
   transmitting second client information related to the first client information from the client device to an access point, the access point to transmit the first client information to the authentication server, and the second client information being linked to the first client information by the authentication server;
   receiving, at the client device, an encrypted authentication credential from the authentication server via the access point, the encrypted authentication credential for the client device to connect to the access point to access a wireless network with a secure wireless connection and being encrypted based at least in part on the first client information or the second client information;
   decrypting, by the client device, the encrypted authentication credential; and
   connecting, by the client device, to the access point associated with the authentication server by completing an authentication procedure using the decrypted authentication credential.

2. The method of claim 1, wherein the first client information comprises a client public key and the second client information comprises a client identification, the client identification being derived from the client public key.

3. The method of claim 2, wherein the encrypted authentication credential is encrypted based at least in part on the client public key transmitted in the first client information, and the encrypted authentication credential is decrypted based at least in part on a client private key corresponding to the client public key.

4. The method of claim 1, wherein the first client information comprises a client authentication token and the second client information comprises a client public key, the client authentication token being derived from the client public key.

5. The method of claim 4, wherein the encrypted authentication credential is encrypted based at least in part on the client public key transmitted in the second client information, and the encrypted authentication credential is decrypted based at least in part on a client private key corresponding to the client public key.

6. The method of claim 1, further comprising:
   exchanging a shared secret key with the authentication server, wherein the encrypted authentication credential is decrypted based at least in part on the shared secret key.

7. The method of claim 1, wherein the authentication procedure comprises an Institute of Electrical and Electronics Engineers (IEEE) 802.1X Extensible Authentication Protocol, and connecting to the access point comprises a Wi-Fi Protected Access II (WPA2) Enterprise connection.

8. The method of claim 1, wherein the secure interface includes at least one of manually entering the first client information, scanning a Quick Response (QR) code of the first client information, transmitting the first client information over an out-of-band wireless channel, or a combination thereof.

9. The method of claim 1, further comprising:
   receiving a server authentication token from the trusted device, the server authentication token being derived from the encrypted authentication credential by the authentication server; and
   verifying the received server authentication token matches a token derived from the decrypted authentication credential.

10. An apparatus for securely provisioning a client device, comprising:
    at least one processor;
    a memory in electronic communication with the at least one processor; and
    instructions stored in the memory, the instructions executable by the at least one processor to:

output first client information over a secure interface to a trusted device authorized by the authentication server, to be transmitted from the trusted device to an authentication server;

transmit second client information related to the first client information from the client device to an access point, the access point to transmit the first client information to the authentication server, and the second client information being linked to the first client information by the authentication server;

receive, at the client device, an encrypted authentication credential from the authentication server via the access point, the encrypted authentication credential for the client device to connect to the access point to access a wireless network with a secure wireless connection and being encrypted based at least in part on the first client information or the second client information;

decrypt, by the client device, the encrypted authentication credential; and connect, by the client device, to the access point associated with the authentication server by completing an authentication procedure using the decrypted authentication credential.

11. The apparatus of claim 10, wherein the first client information comprises a client public key and the second client information comprises a client identification, the client identification being derived from the client public key, the encrypted authentication credential being encrypted based at least in part on the client public key transmitted in the first client information, and the encrypted authentication credential being decrypted based at least in part on a client private key corresponding to the client public key.

12. The apparatus of claim 10, wherein the first client information comprises a client authentication token and the second client information comprises a client public key, the client authentication token being derived from the client public key, and the encrypted authentication credential being encrypted based at least in part on the client public key transmitted in the second client information, and the encrypted authentication credential being decrypted based at least in part on a client private key corresponding to the client public key.

13. The apparatus of claim 10, wherein the instructions executable by the at least one processor further comprise instructions to:

exchange a shared secret key with the authentication server, wherein the encrypted authentication credential is decrypted based at least in part on the shared secret key.

14. The apparatus of claim 10, wherein the authentication procedure comprises an Institute of Electrical and Electronics Engineers (IEEE) 802.1X Extensible Authentication Protocol, and connecting to the access point comprises a Wi-Fi Protected Access II (WPA2) Enterprise connection.

15. The apparatus of claim 10, wherein the secure interface includes at least one of manually entering the first client information, scanning a Quick Response (QR) code of the first client information, and transmitting the first client information over an out-of-band wireless channel.

16. The apparatus of claim 10, wherein the instructions executable by the at least one processor further comprise instructions to:

receive a server authentication token from the trusted device, the server authentication token being derived from the encrypted authentication credential by the authentication server; and verify the received server authentication token matches a token derived from the decrypted authentication credential.

17. An apparatus for securely provisioning a client device, comprising:

a secure interface output to output first client information over a secure interface to a trusted device authorized by the authentication server, to be transmitted from the trusted device to an authentication server;

a transmitter to transmit second client information related to the first client information from the client device to an access point, the access point to transmit the first client information to the authentication server, and the second client information being linked to the first client information by the authentication server;

a receiver to receive, at the client device, an encrypted authentication credential from the authentication server via the access point, the encrypted authentication credential for the client device to connect to the access point to access a wireless network with a secure wireless connection and being encrypted based at least in part on the first client information or the second client information; and an authenticator to decrypt, by the client device, the encrypted authentication credential and connect, by the client device, to the access point associated with the authentication server by completing an authentication procedure using the decrypted authentication credential.

18. The apparatus of claim 17, wherein the first client information comprises a client public key and the second client information comprises a client identification, the client identification being derived from the client public key, the encrypted authentication credential being encrypted based at least in part on the client public key transmitted in the first client information, and the encrypted authentication credential being decrypted based at least in part on a client private key corresponding to the client public key.

19. The apparatus of claim 17, wherein the first client information comprises a client authentication token and the second client information comprises a client public key, the client authentication token being derived from the client public key, and the encrypted authentication credential being encrypted based at least in part on the client public key transmitted in the second client information, and the encrypted authentication credential being decrypted based at least in part on a client private key corresponding to the client public key.

20. The apparatus of claim 17, wherein the authenticator exchanges a shared secret key with the authentication server, and wherein the authenticator decrypts the encrypted authentication credential based at least in part on the shared secret key.

21. The apparatus of claim 17, wherein the secure interface includes at least one of manually entering the first client information, scanning a Quick Response (QR) code of the first client information, transmitting the first client information over an out-of-band wireless channel, or a combination thereof.

22. A non-transitory computer-readable medium storing computer-executable code for wireless communication, the code executable by a processor to:

output first client information over a secure interface to a trusted device authorized by the authentication server, to be transmitted from the trusted device to an authentication server;

transmit second client information related to the first client information from the client device to an access point, the access point to\transmit the first client information to the authentication server, and the second client information being linked to the first client information by the authentication server;

receive, at the client device, an encrypted authentication credential from the authentication server via the access point, the encrypted authentication credential for a client device to connect to the access point to access a wireless network with a secure wireless connection and being encrypted based at least in part on the first client information or the second client information;

decrypt, by the client device, the encrypted authentication credential; and connecting, by the client device, to the access point associated with the authentication server by completing an authentication procedure using the decrypted authentication credential.

23. The non-transitory computer-readable medium of claim 22, wherein the first client information comprises a client public key and the second client information comprises a client identification, the client identification being derived from the client public key, the encrypted authentication credential being encrypted based at least in part on the client public key transmitted in the first client information, and the encrypted authentication credential being decrypted based at least in part on a client private key corresponding to the client public key.

24. The non-transitory computer-readable medium of claim 22, wherein the first client information comprises a client authentication token and the second client information comprises a client public key, the client authentication token being derived from the client public key, and the encrypted authentication credential being encrypted based at least in part on the client public key transmitted in the second client information, and the encrypted authentication credential being decrypted based at least in part on a client private key corresponding to the client public key.

25. The non-transitory computer-readable medium of claim 22, wherein the instructions executable by the processor further comprise instructions to:
exchange a shared secret key with the authentication server, wherein the encrypted authentication credential is decrypted based at least in part on the shared secret key.

26. The non-transitory computer-readable medium of claim 22, wherein the secure interface includes at least one of manually entering the first client information, scanning a Quick Response (QR) code of the first client information, transmitting the first client information over an out-of-band wireless channel, or a combination thereof.

* * * * *

UNITED STATES PATENT AND TRADEMARK OFFICE
CERTIFICATE OF CORRECTION

| | | |
|---|---|---|
| PATENT NO. | : 9,654,972 B2 | |
| APPLICATION NO. | : 14/462272 | |
| DATED | : May 16, 2017 | |
| INVENTOR(S) | : Beniot et al. | |

It is certified that error appears in the above-identified patent and that said Letters Patent is hereby corrected as shown below:

In the Claims

Column 31 Lines 55-67 and Column 32 Lines 1-14 should read:
1. A method for securely provisioning a client device, comprising:
   outputting first client information over a secure interface to a trusted device authorized by an authentication server, to be transmitted from the trusted device to the authentication server;
   transmitting second client information related to the first client information from the client device to an access point, the access point to transmit the second client information to the authentication server, and the second client information being linked to the first client information by the authentication server;
   receiving, at the client device, an encrypted authentication credential from the authentication server via the access point, the encrypted authentication credential for the client device to connect to the access point to access a wireless network with a secure wireless connection and being encrypted based at least in part on the first client information or the second client information;
   decrypting, by the client device, the encrypted authentication credential; and
   connecting, by the client device, to the access point associated with the authentication server by completing an authentication procedure using the decrypted authentication credential.

Column 33 Lines 25-33 should read:
11. An apparatus for securely provisioning a client device, comprising:
   at least one processor;
   a memory in electronic communication with the at least one processor; and
   instructions stored in the memory, the instructions executable by the at least one processor to:

Signed and Sealed this
Tenth Day of October, 2017

Joseph Matal
*Performing the Functions and Duties of the
Under Secretary of Commerce for Intellectual Property and
Director of the United States Patent and Trademark Office* output first client information over a secure interface to a trusted device authorized by an authentication server, to be transmitted from the trusted device to the authentication server;

transmit second client information related to the first client information from the client device to an access point, the access point to transmit the second client information to the authentication server, and the second client information being linked to the first client information by the authentication server;

receive, at the client device, an encrypted authentication credential from the authentication server via the access point, the encrypted authentication credential for the client device to connect to the access point to access a wireless network with a secure wireless connection and being encrypted based at least in part on the first client information or the second client information;

decrypt, by the client device, the encrypted authentication credential; and connect, by the client device, to the access point associated with the authentication server by completing an authentication procedure using the decrypted authentication credential.

Column 34 Lines 40-49 should read:
19. As apparatus for securely provisioning a client device, comprising:

a secure interface output to output first client information over a secure interface to a trusted device authorized by an authentication server, to be transmitted from the trusted device to the authentication server;

a transmitter to transmit second client information related to the first client information from the client device to an access point, the access point to transmit the second client information to the authentication server, and the second client information being linked to the first client information by the authentication server;

a receiver to receive, at the client device, an encrypted authentication credential from the authentication server via the access point, the encrypted authentication credential for the client device to connect to the access point to access a wireless network with a secure wireless connection and being encrypted based at least in part on the first client information or the second client information; and an authenticator to decrypt, by the client device, the encrypted authentication credential and connect, by the client device, to the access point associated with the authentication server by completing an authentication procedure using the decrypted authentication credential.

Column 36 Lines 13-20 should read:
25. A non-transitory computer-readable medium storing computer-executable code for wireless communication, the code executable by a processor to:

output first client information over a secure interface to a trusted device authorized by an authentication server, to be transmitted from the trusted device to the authentication server;

transmit second client information related to the first client information from a client device to an access point, the access point to transmit the second client information to the authentication server, and the second client information being linked to the first client information by the authentication server;

receive, at the client device, an encrypted authentication credential from the authentication server via the access point, the encrypted authentication credential for the client device to connect to the access point to access a wireless network with a secure wireless connection and being encrypted based at least in part on the first client information or the second client information;

decrypt, by the client device, the encrypted authentication credential; and connecting, by the client device, to the access point associated with the authentication server by completing an authentication procedure using the decrypted authentication credential.